United States Patent
Shen et al.

(10) Patent No.: US 11,032,205 B2
(45) Date of Patent: Jun. 8, 2021

(54) FLOW CONTROL METHOD AND SWITCHING DEVICE

(71) Applicant: Huawei Technologies Co., Ltd., Shenzhen (CN)

(72) Inventors: Li Shen, Nanjing (CN); Hong Zhou, Nanjing (CN); Heyang Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/448,730

(22) Filed: Jun. 21, 2019

(65) Prior Publication Data

US 2019/0312816 A1 Oct. 10, 2019

Related U.S. Application Data

(63) Continuation of application No. PCT/CN2017/109376, filed on Nov. 3, 2017.

(30) Foreign Application Priority Data

Dec. 23, 2016 (CN) .......................... 201611204785.X

(51) Int. Cl.
*H04L 12/825* (2013.01)
*H04L 12/851* (2013.01)
(Continued)

(52) U.S. Cl.
CPC ............ *H04L 47/263* (2013.01); *H04L 47/11* (2013.01); *H04L 47/24* (2013.01); *H04L 47/2433* (2013.01); *H04L 47/25* (2013.01); *H04L 47/26* (2013.01); *H04L 47/30* (2013.01); *H04L 47/41* (2013.01)

(58) Field of Classification Search
CPC ..... H04L 47/26; H04L 47/41; H04L 47/2433; H04L 47/263; H04L 47/25; H04L 47/30
See application file for complete search history.

(56) References Cited

U.S. PATENT DOCUMENTS

| 6,108,713 A * | 8/2000 | Sambamurthy ......... H04L 29/06 370/463 |
| 6,628,613 B1 * | 9/2003 | Joung .................... H04L 47/10 370/230 |

(Continued)

FOREIGN PATENT DOCUMENTS

| CN | 1918850 A | 2/2007 |
| CN | 101854402 A | 10/2010 |

(Continued)

*Primary Examiner* — Syed Ali

(74) *Attorney, Agent, or Firm* — Slater Matsil, LLP

(57) ABSTRACT

A flow control method includes: when congestion is detected, determining, by a first switching device, a key flow from a plurality of data flows; generating a back pressure message including a flow attribute value of the key flow; sending the back pressure message to an upstream device of the key flow; and pausing, by the upstream device of the key flow, sending of the key flow, where the back pressure message has no impact on sending of another data flow other than the key flow by the upstream device of the key flow. The present disclosure further provides a switching device that can implement the flow control method.

20 Claims, 19 Drawing Sheets

(51) Int. Cl.
*H04L 12/891* (2013.01)
*H04L 12/801* (2013.01)
*H04L 12/835* (2013.01)

(56) References Cited

U.S. PATENT DOCUMENTS

| | | | |
|---|---|---|---|
| 8,873,392 B1 | 10/2014 | Orr | |
| 10,063,481 B1* | 8/2018 | Jiang | H04L 5/0055 |
| 2003/0016628 A1* | 1/2003 | Kadambi | H04L 47/266 |
| | | | 370/235 |
| 2003/0156542 A1* | 8/2003 | Connor | H04L 47/30 |
| | | | 370/236 |
| 2005/0089054 A1* | 4/2005 | Ciancaglini | H04L 49/3027 |
| | | | 370/412 |
| 2005/0174941 A1 | 8/2005 | Shanley et al. | |
| 2006/0092836 A1* | 5/2006 | Kwan | H04L 47/283 |
| | | | 370/229 |
| 2009/0300209 A1* | 12/2009 | Elzur | H04L 47/24 |
| | | | 709/234 |
| 2011/0110236 A1* | 5/2011 | Kadambi | H04L 49/50 |
| | | | 370/235 |
| 2012/0063493 A1* | 3/2012 | Hasegawa | H04L 47/263 |
| | | | 375/211 |
| 2012/0254483 A1 | 10/2012 | Chen | |
| 2014/0025837 A1* | 1/2014 | Swenson | H04N 21/23439 |
| | | | 709/231 |
| 2014/0269319 A1 | 9/2014 | Decusatis et al. | |
| 2015/0350049 A1 | 12/2015 | Yang et al. | |
| 2019/0059023 A1* | 2/2019 | Forsman | H04L 47/26 |

FOREIGN PATENT DOCUMENTS

| | | |
|---|---|---|
| CN | 102469492 A | 5/2012 |
| CN | 103997465 A | 8/2014 |
| EP | 2950489 A1 | 12/2015 |

* cited by examiner

FLOW CONTROL METHOD AND SWITCHING DEVICE

CROSS-REFERENCE TO RELATED APPLICATIONS

This application is a continuation of International Application No. PCT/CN2017/109376, filed on Nov. 3, 2017, which claims priority to Chinese Patent Application No. 201611204785.X, filed on Dec. 23, 2016. The disclosures of the aforementioned applications are hereby incorporated by reference in their entireties.

TECHNICAL FIELD

The present disclosure relates to the field of network technologies, and in particular, to a flow control method and a switching device.

BACKGROUND

Flow control can effectively prevent impact on a network caused by an instant large amount of data, and ensure efficient and stable running of a user network.

Priority-based flow control (PFC) is also referred to as per priority pause or class based flow control (CBFC), and is an improvement of an existing Ethernet pause mechanism. In a PFC mechanism, several send queues with different priorities are configured for a transmit end, and receive queues corresponding to the send queues are configured for a receive end. For send queues with different priorities, the receive end may perform control by using a separate back pressure frame, and the back pressure frame is also referred to as a pause frame. As shown in FIG. 1, when congestion occurs in a receive queue whose priority is 7 in a receive end (for example, a device B), the receive end sends a back pressure frame to a transmit end (for example, a device A), to instruct the device A to pause sending of a data frame in a send queue whose priority is 7. When an amount of data in the receive queue whose priority is 7 is less than a specific threshold, the device B may send a cancel back pressure frame to the device A, to instruct the device A to normally send the data frame in the send queue whose priority is 7. In the foregoing back pressure process, another send queue and receive queue are not affected.

As shown in FIG. 2, when congestion occurs in an output port 3 of the device A, the device A feeds back a pause frame to all input ports that make the port 3 congested. Based on the pause frame fed back by the device A, the device B pauses sending of all data from a port 3. Even if to-be-sent data in the port 3 of the device B does not aim to the port 3 of the device A, the device B pauses sending of the data. Consequently, header congestion is caused. In the PFC mechanism, a downstream switching device sends a back pressure frame to an upstream switching device, so that a large quantity of switching devices pause packet sending in the network. Consequently, congestion diffusion occurs, a throughput rate is reduced, and an average delay is increased. As a result, performance of the entire network is degraded.

SUMMARY

The present disclosure provides a flow control method and a switching device, to effectively alleviate congestion, avoid packet loss, and effectively control congestion diffusion, thereby improving network data exchange performance.

A first aspect provides a flow control method, including: when congestion is detected, determining, by a first switching device, a key flow from a plurality of data flows based on a preset condition; generating a back pressure message including a flow attribute value of the key flow; and sending the back pressure message to an upstream device of the key flow, where the back pressure message is used to instruct the upstream device of the key flow to pause sending of the key flow, and the back pressure message has no impact on sending of another data flow other than the key flow by the upstream device of the key flow. The upstream device of the key flow is a second switching device and is connected to the first switching device. According to this implementation, a network device delays only sending of the key flow. Because the key flow includes more flow attributes, a granularity is smaller, and congestion diffusion can be reduced in comparison with pausing all data flows corresponding to priorities in the prior art, thereby improving network data exchange performance.

In a possible implementation of the first aspect, before the generating a back pressure message including a flow attribute value of the key flow, the first switching device creates a key flow virtual channel for the key flow, adds a subsequent packet that belongs to the key flow or a buffer address of the subsequent packet to the key flow virtual channel. The subsequent packet is a packet that is received by the first switching device and that is not added to a send queue. According to this implementation, the first switching device can separate the key flow from a non-key flow, and sending of a packet of the non-key flow is not affected when sending of the key flow is paused.

Further, in another possible implementation of the first aspect, when a data amount of packets in a send queue corresponding to the key flow does not exceed a first preset threshold, the first switching device extracts a packet of the key flow from a buffer corresponding to the key flow virtual channel, and adds the extracted packet to the send queue. According to this implementation, when detecting that no congestion occurs, the first switching device may continue to forward the key flow.

In another possible implementation of the first aspect, after the packet address of the subsequent packet that belongs to the key flow is added to the key flow virtual channel, when a data amount of packets in the buffer corresponding to the key flow virtual channel exceeds a first preset value, the first switching device generates the back pressure message including the flow attribute value of the key flow. It can be learned that a switch may perform a back pressure procedure in different triggering conditions.

In another possible implementation of the first aspect, when the data amount of the packets in the buffer corresponding to the key flow virtual channel does not exceed a second preset value, the first switching device generates a cancel back pressure message, and sends the cancel back pressure message to a second switching device. The second preset value is less than or equal to the first preset value. It can be learned that a switch may perform a cancel back pressure procedure in different triggering conditions.

In another possible implementation of the first aspect, the preset condition is a preset traffic threshold, and the determining a key flow from a plurality of data flows based on a preset condition may be: when detecting that the data amount of the packets in the send queue exceeds a second preset threshold, taking, by the first switching device, a data flow whose traffic is greater than the preset traffic threshold in the plurality of data flows as the key flow; or when detecting that congestion occurs in the send queue, determining, by the first switching device, a data amount of each data flow in the send queue, and taking a data flow with a largest data amount as the key flow.

A second aspect provides a flow control method, including: receiving, by a second switching device, a back pressure message sent by a first switching device; determining a key flow in a plurality of data flows based on a flow attribute value included in the back pressure message; and pausing sending of the key flow to the first switching device. According to this implementation, the second switching device pauses sending of the key flow, and the first switching device may forward a data flow by using a pause time, to resolve congestion.

In a possible implementation of the second aspect, after the determining, by the second switching device, a key flow in a plurality of data flows based on a flow attribute value, the second switching device creates a key flow virtual channel for the key flow, adds a subsequent packet that belongs to the key flow or a buffer address of the subsequent packet to the key flow virtual channel. When detecting that information meets a preset cancel back pressure condition, the second switching device extracts a packet of the key flow from a buffer corresponding to the key flow virtual channel, and adds the extracted packet to a send queue. According to this implementation, the second switching device can separate the key flow from a non-key flow, and sending of a packet of the non-key flow is not affected when sending of the key flow is paused.

In another possible implementation of the second aspect, after the receiving, by a second switching device, a back pressure message sent by a first switching device, the second switching device starts a timer based on the back pressure message; and when timing duration of the timer is not less than preset duration, the second switching device extracts the packet of the key flow from the buffer corresponding to the key flow virtual channel. According to this implementation, when the second switching device does not receive a cancel back pressure message, the second switching device continues to send the key flow to the first switching device. Even if a cancel back pressure frame is lost in a transmission process, the second switching device may continue to send the key flow to the first switching device.

In another possible implementation of the second aspect, when receiving the cancel back pressure message sent by the first switching device, the second switching device extracts the packet of the key flow from the buffer corresponding to the key flow virtual channel. According to this implementation, when receiving the cancel back pressure message, the second switching device may continue to send the key flow to the first switching device.

A third aspect provides a switching device, and the switching device has functions of the first switching device that implements the flow control method provided in the first aspect. The functions may be implemented by hardware, or may be implemented by hardware by executing corresponding software. The hardware or the software includes one or more modules corresponding to the functions.

A fourth aspect provides a switching device, and the switching device has functions of the second switching device that implements the flow control method provided in the second aspect. The functions may be implemented by hardware, or may be implemented by hardware by executing corresponding software. The hardware or the software includes one or more modules corresponding to the functions.

It can be learned from embodiments of the present disclosure that, when congestion is detected, the first switching device may determine, from a plurality of data flows, a key flow that causes congestion; and then send a plurality of attribute values of the key flow to an upstream device of the key flow. The upstream device of the key flow may pause sending of the key flow to the first switching device. For an entire network, a back pressure frame is transmitted to the upstream device, so that a related device in the entire network may pause sending of the key flow. Because congestion is mainly caused by the key flow, congestion can be effectively alleviated, and packet loss can be avoided. A granularity of data flow-based flow control is smaller than that of priority-based flow control. Only sending of the key flow is delayed in the present disclosure, and congestion diffusion can be reduced in comparison with pausing all data flows corresponding to priorities, thereby improving network data exchange performance.

DETAILED DESCRIPTION OF ILLUSTRATIVE EMBODIMENTS

Figure 1:
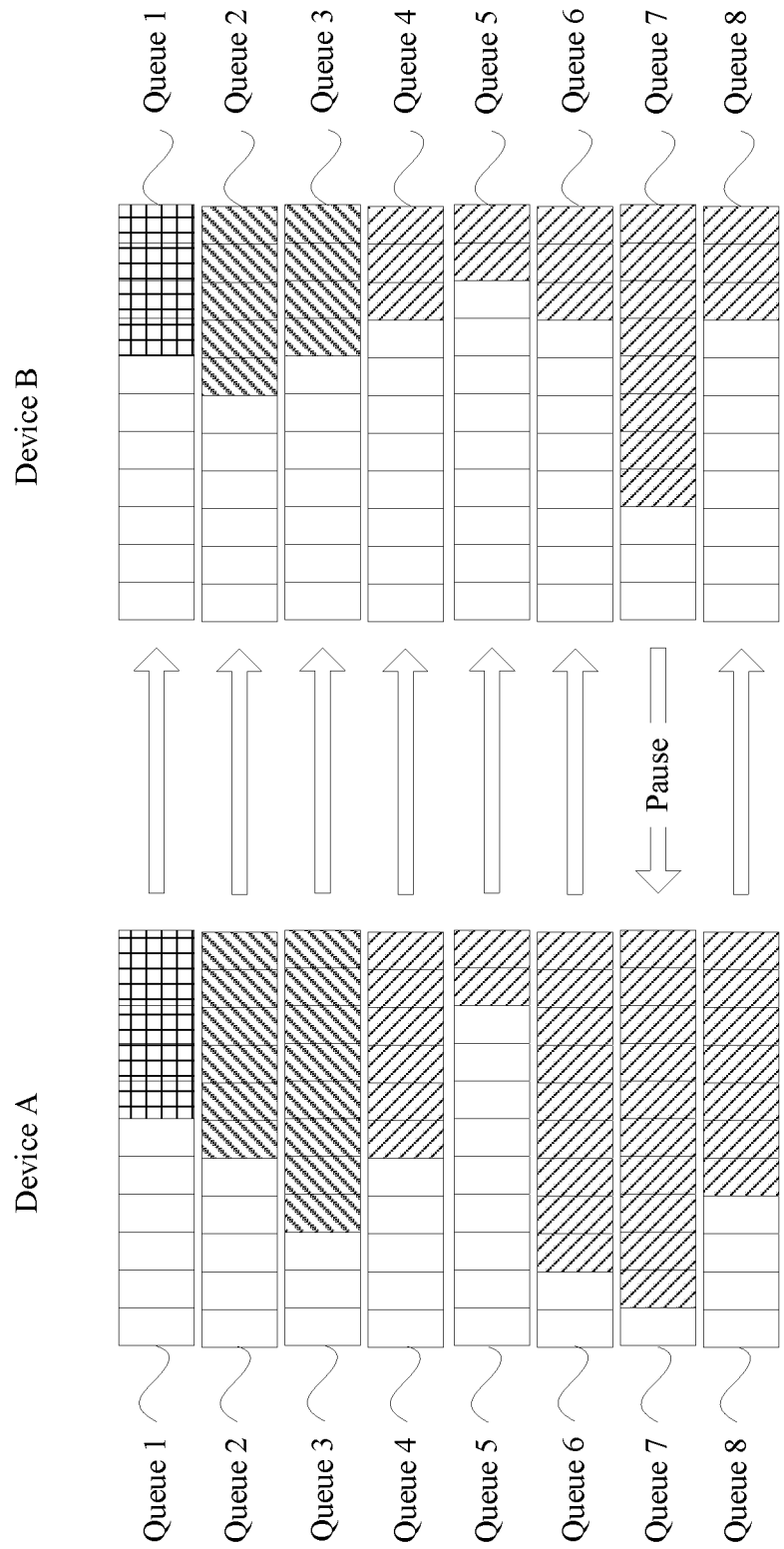
FIG. 1 is a schematic flowchart of a flow control method in the prior art.
Figure 2:
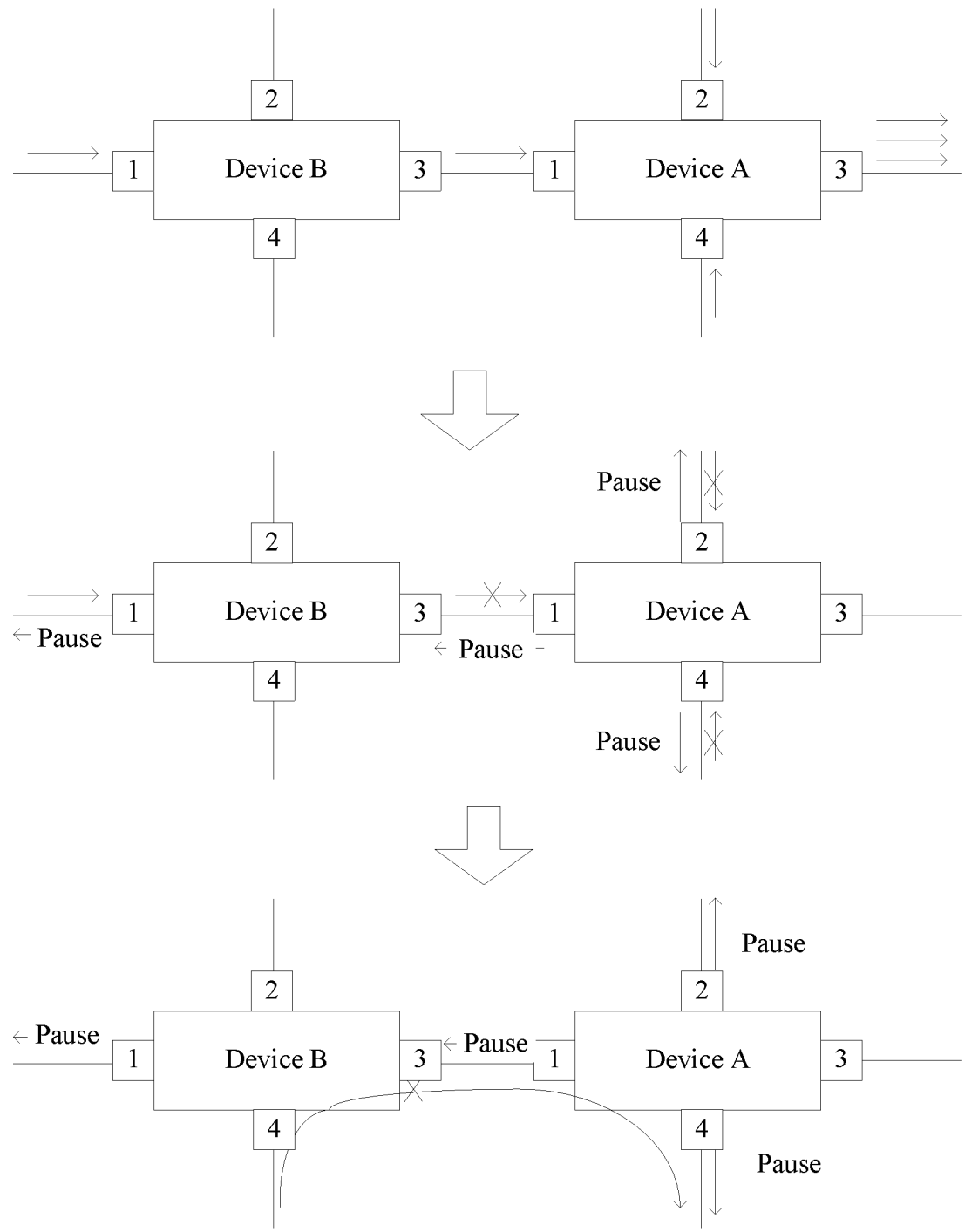
FIG. 2 is another schematic flowchart of a flow control method in the prior art.
Figure 3:
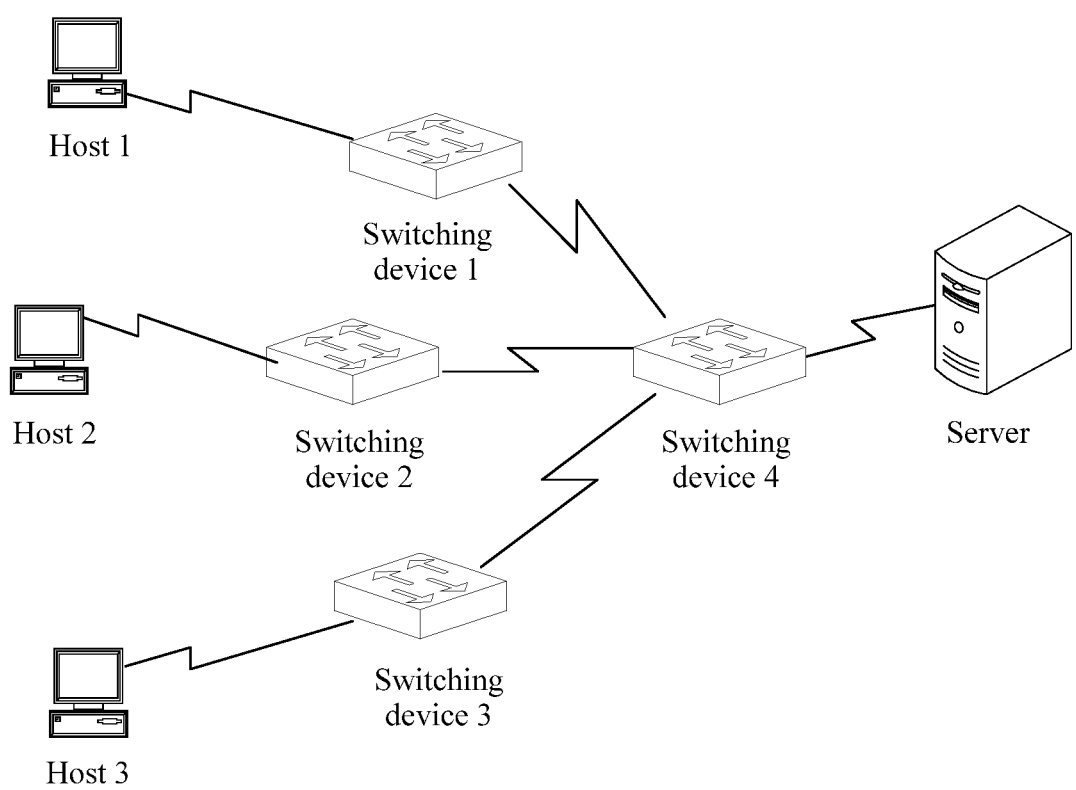
FIG. 3 is a schematic structural diagram of an application scenario according to an embodiment of the present disclosure.

The present disclosure discloses a flow control method. A communications network to which the method is applied may be an Ethernet or a network constructed by an infiniBand technology. The Ethernet is a standard Ethernet, a fast Ethernet, or a subsequently evolved Ethernet. First, the communications network is described. Referring to FIG. 3, the communications network includes a host, a switching device, and a server. There may be one or more hosts, switching devices, and servers. The switching device may be a switch or a bridge device. The switch is a network device configured to forward an optical or electrical signal. The switch may provide an exclusive electrical signal path or optical signal path for any two network nodes that access the switch.

The host may be a device such as a mobile terminal (including but not limited to a notebook computer, a mobile phone, a tablet, a palmtop computer, a POS machine, an MP3, or a navigator), a fixed terminal (including but not limited to a desktop, a printer, a fax machine, a digital projector, or a digital television), or a wireless access terminal.

The server is a device that provides a computing service. In a network environment, the server is classified into a file server, a database server, an application server, a WEB server, and the like based on different service types provided by the server.

According to the flow control method provided in the present disclosure and applied to the communications network shown in FIG. 3, a core idea of the method is that sending of a data flow that mainly causes congestion in a network is delayed by using a back pressure frame, to resolve congestion. Because only sending of a key flow is delayed, a network device that does not transmit the key flow is not affected, and can still normally send a packet, thereby effectively reducing congestion diffusion.

Figure 4:
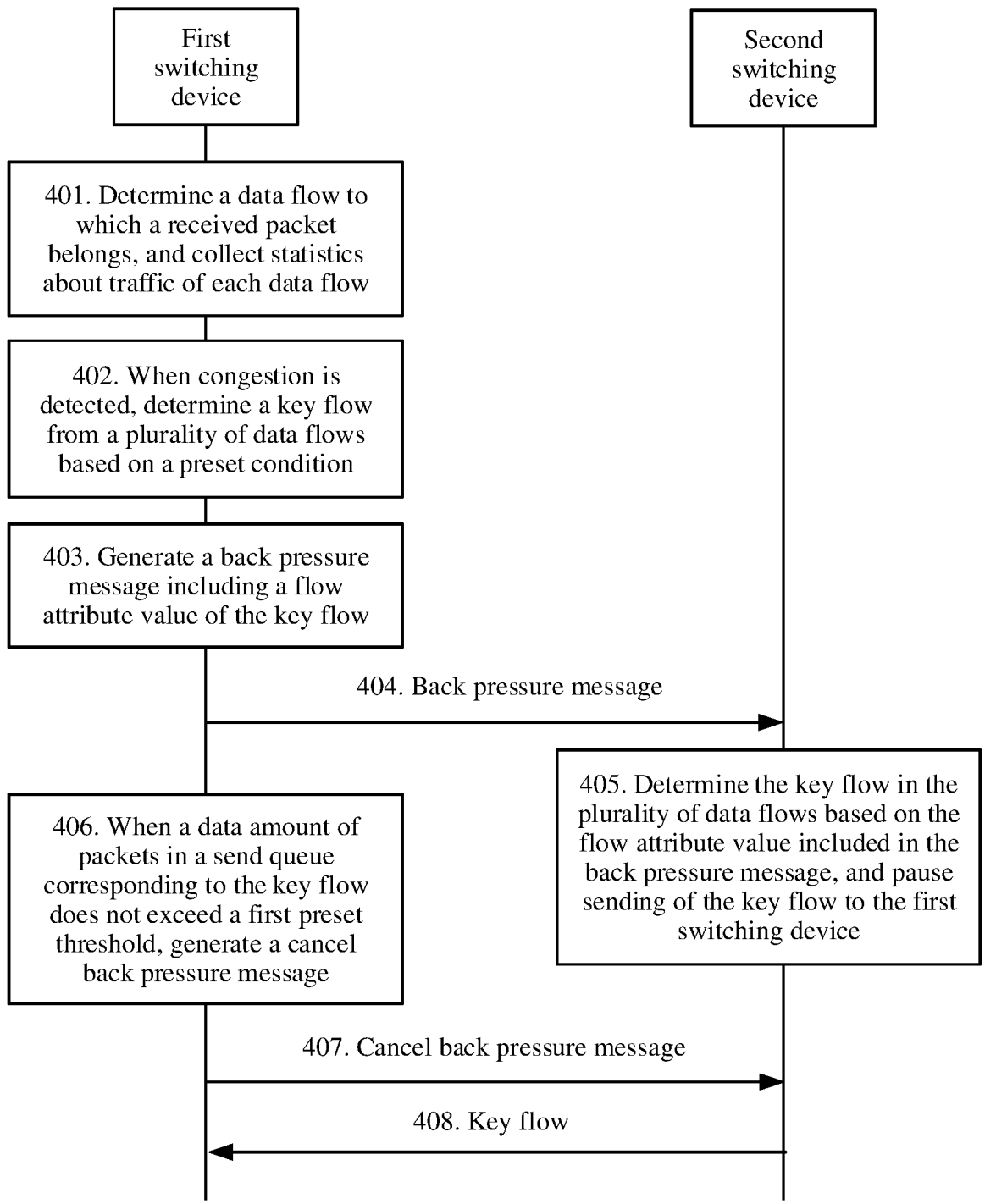
FIG. 4 is a schematic flowchart of a flow control method according to an embodiment of the present disclosure.

First, a flow control method between switching devices is described. Referring to FIG. 4, an embodiment of a flow control method provided in the present disclosure includes the following steps.

Step 401: A first switching device determines a data flow to which a received packet belongs, and collects statistics about traffic of each data flow.

In this embodiment, the switching device may determine, based on attribute values of one or more flow attributes, the data flow to which the received packet belongs. The flow attributes include a source Internet Protocol (IP) address, a destination IP address, a protocol number, a source port number, a destination port number, a packet priority, and the like. Based on a flow attribute of the determined data flow, the first switching device creates a flow table, and collects statistics about the traffic of each data flow. For a specific method for determining a data flow, refer to the following embodiments.

In an optional embodiment, the first switching device determines different data flows based on values of the source IP address and the packet priority. Packets included in each data flow have a same source IP address and packet priority. In another optional embodiment, the first switching device determines different data flows based on values of the source IP address, the destination IP address, and the packet priority. In another optional embodiment, the first switching device determines different data flows based on the source IP address, the destination IP address, the protocol number, the source port number, and the destination port number. In another optional embodiment, the first switching device determines different data flows based on the source IP address and the destination IP address.

Step 402: When congestion is detected, the first switching device determines a key flow from a plurality of data flows based on a preset condition.

When it is detected that a data amount of packets in a send queue of the first switching device exceeds a second preset threshold, it may be determined that congestion occurs in the first switching device. The send queue may be a send queue of a port of the first switching device. The first switching device may determine the key flow from the plurality of data flows based on the preset condition in a plurality of manners. For details, refer to the following embodiments.

In an optional embodiment, the first switching device collects statistics about traffic of each data flow in a plurality of data flows that are sent within configuration duration by using the send queue, and takes a data flow whose traffic is greater than a preset traffic threshold in the plurality of data flows as the key flow. A flow table is set in the switching device, the flow table includes a flow entry corresponding to each data flow, and each flow entry is used to record a quantity of bytes of packets that are sent by the switching device within the configuration duration and that belong to the data flow corresponding to the flow entry. The switching device collects, based on the flow table, statistics about a quantity of bytes of each data flow sent within the configuration duration. If a quantity of bytes of an $i^{th}$ data flow sent within the configuration duration exceeds the preset traffic threshold, it indicates that the $i^{th}$ data flow is a large data flow that is prone to cause congestion, and it is determined that the data flow is the key flow. If a quantity of bytes of a data flow sent within the configuration duration does not exceed the preset traffic threshold, it indicates that the data flow is not prone to cause congestion, and it is determined that the data flow is not the key flow. The foregoing method is also referred to as an elephant flow detection method. The preset traffic threshold is used to measure whether a data flow is a key flow, and a value of the preset traffic threshold may be set based on a sending capability of the switching device.

In another optional embodiment, when detecting that congestion occurs in a send queue, the switching device collects statistics about a data amount of each data flow in the send queue, and takes a data flow with a largest data amount as the key flow. The data amount is represented by using a quantity of bytes. A flow table is set in the switching device, the flow table includes a flow entry corresponding to each data flow, and the flow entry is used to record a queue corresponding to the data flow and a quantity of bytes in the queue. Before scheduling a packet to the send queue, the switching device first searches the flow table. If a flow entry corresponding to a data flow to which the packet belongs can be found, a quantity of bytes of the packet is added to a quantity of bytes recorded in the flow entry. If a flow entry corresponding to a data flow to which the packet belongs cannot be found, it indicates that the data flow to which the packet belongs is not in any send queue, and the switching device creates the flow entry in the flow table for the data flow to which the packet belongs, and records a quantity of bytes of the packet in the flow entry. When the packet leaves the send queue, the quantity of bytes of the packet is subtracted from a quantity of bytes recorded in the flow entry of the data flow to which the packet belongs. If a quantity of bytes recorded in a flow entry is 0, the flow entry is set to be invalid, and the flow entry is released. A preset data amount is used to measure whether a data flow is a key flow, and a value of the preset data amount may be determined based on a total data capacity of a send queue and a congestion proportion. For example, the preset data amount is obtained by multiplying the total data capacity of the send queue by the congestion proportion. The congestion proportion may be any percentage that is greater than 50% and less than 100%.

Step 403: The first switching device generates a back pressure message including a flow attribute value of the key flow. The flow attribute value is attribute values of a plurality of flow attributes of the key flow. The back pressure message may be a back pressure frame.

It should be noted that, if there are a plurality of key flows, the first switching device may generate the back pressure message based on only a flow attribute value of a key flow with largest traffic. In this way, back pressure is first performed on the key flow with largest traffic, to pause sending of the key flow with largest traffic. If the first switching device is still in a congested state, the first switching device generates another back pressure message based on a flow attribute of a key flow with largest traffic in remaining key flows, and continues to perform back pressure on the remaining key flows until congestion of the first switching device is alleviated.

For example, some fields included in the back pressure frame of the present disclosure may be shown in the following table:

| Field name | Field meaning |
| --- | --- |
| Destination address | Destination MAC address. Value: 01-80-c2-00-00-01. |
| Source address | Source MAC address. |
| Ethertype | Ethernet frame type. Value: 88-08. |
| Control opcode | Control code. The value 01-11 indicates pause (back pressure frame), and the value 01-12 indicates resume (cancel back pressure frame). |
| Flow count | A quantity of flows carried in a current back pressure frame. |
| Flow Info | Flow information, such as a source-destination IP address pair (including a source IP address and a destination IP address) and/or a priority. |
| Pad (transmit as zero) | Reserved. Its value is 0 during transmission. |
| CRC | Cyclic redundancy code. |

Cyclic redundancy check (Cyclic Redundancy Check, CRC for short).

Step 404: The first switching device sends the back pressure message to a second switching device.

The second switching device is an upstream device of the key flow for the first switching device.

Step 405: The second switching device determines the key flow in the plurality of data flows based on the flow attribute value included in the back pressure message, and pauses sending of the key flow to the first switching device.

The upstream device of the key flow is the second switching device connected to the first switching device. The back pressure message is used to instruct the second switching device to pause sending of the key flow, thereby effectively alleviating congestion and avoiding packet loss. The back pressure message has no impact on sending of another data flow other than the key flow by the second switching device. Therefore, in this embodiment of the present disclosure, all or some of data flows can be accurately controlled. Compared with the prior art, traffic is controlled more accurately and flexibly in this embodiment of the present disclosure.

It may be understood that step 401 to step 405 are a back pressure procedure between the first switching device and the second switching device. When congestion occurs in the second switching device, the second switching device may continue to send a pause frame to an upstream device of the key flow. Another switching device may follow such a pattern. It can be learned that, according to this embodiment of the present disclosure, congestion can be resolved, packet loss can be avoided, and congestion diffusion can be effectively lessened.

Step 406: When a data amount of packets in a send queue corresponding to the key flow does not exceed a first preset threshold, the first switching device generates a cancel back pressure message. The first preset threshold is less than or equal to the second preset threshold. When the data amount of the packets in the send queue corresponding to the key flow does not exceed the first preset threshold, it indicates that the send queue is in a non-congested state and has a capability of continuing to send more data. In this case, step 407 may be triggered.

Step 407: The first switching device sends the cancel back pressure message to the second switching device.

Step 408: The second switching device sends the key flow to the first switching device.

When receiving the cancel back pressure message from the first switching device, the second switching device determines that a preset cancel back pressure condition is met, and sends the key flow to the first switching device. Alternatively, when receiving the back pressure message, the second switching device starts a timer, and when timing duration of the timer is not less than preset duration, the second switching device sends the key flow to the first switching device.

In this embodiment, step 406 to step 408 are a cancel back pressure procedure. After sending of the key flow is paused for a period of time, when the first switching device is in a non-congested state, the second switching device can continue to send the key flow to the first switching device, and may send a cancel back pressure frame to an upstream device of the key flow. Another switching device may follow such a pattern.

Figure 5:
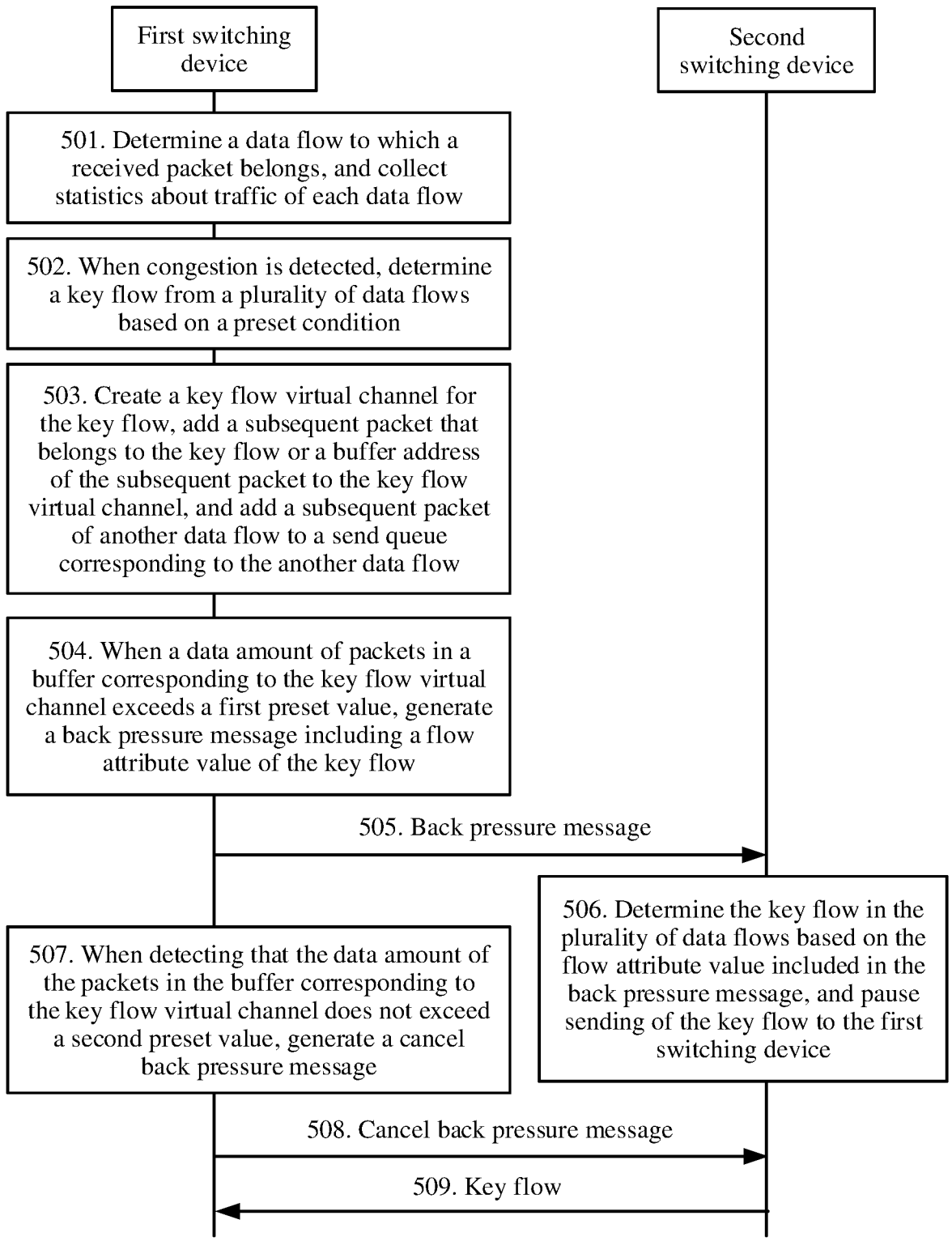
FIG. 5 is a schematic flowchart of a flow control method according to an embodiment of the present disclosure.

A switching device provided in the present disclosure may further create a key flow virtual channel for the key flow, to schedule the key flow. Referring to FIG. 5, another embodiment of a flow control method provided in the present disclosure includes the following steps.

Step 501: A first switching device determines a data flow to which a received packet belongs, and collects statistics about traffic of each data flow.

Step 502: When congestion is detected, the first switching device determines a key flow from a plurality of data flows based on a preset condition. Step 501 and step 502 are similar to step 401 and step 402.

Step 503: After determining the key flow from the plurality of data flows based on the preset condition, the first switching device creates a key flow virtual channel for the key flow, adds a subsequent packet that belongs to the key flow or a buffer address of the subsequent packet to the key flow virtual channel, and adds a subsequent packet of another data flow to a send queue corresponding to the another data flow. The another data flow is different from the key flow. The subsequent packet is a packet that is received by the first switching device and that is not added to a send queue. The send queue corresponding to the another data flow may be the same as or different from a send queue corresponding to the key flow.

Figure 6:
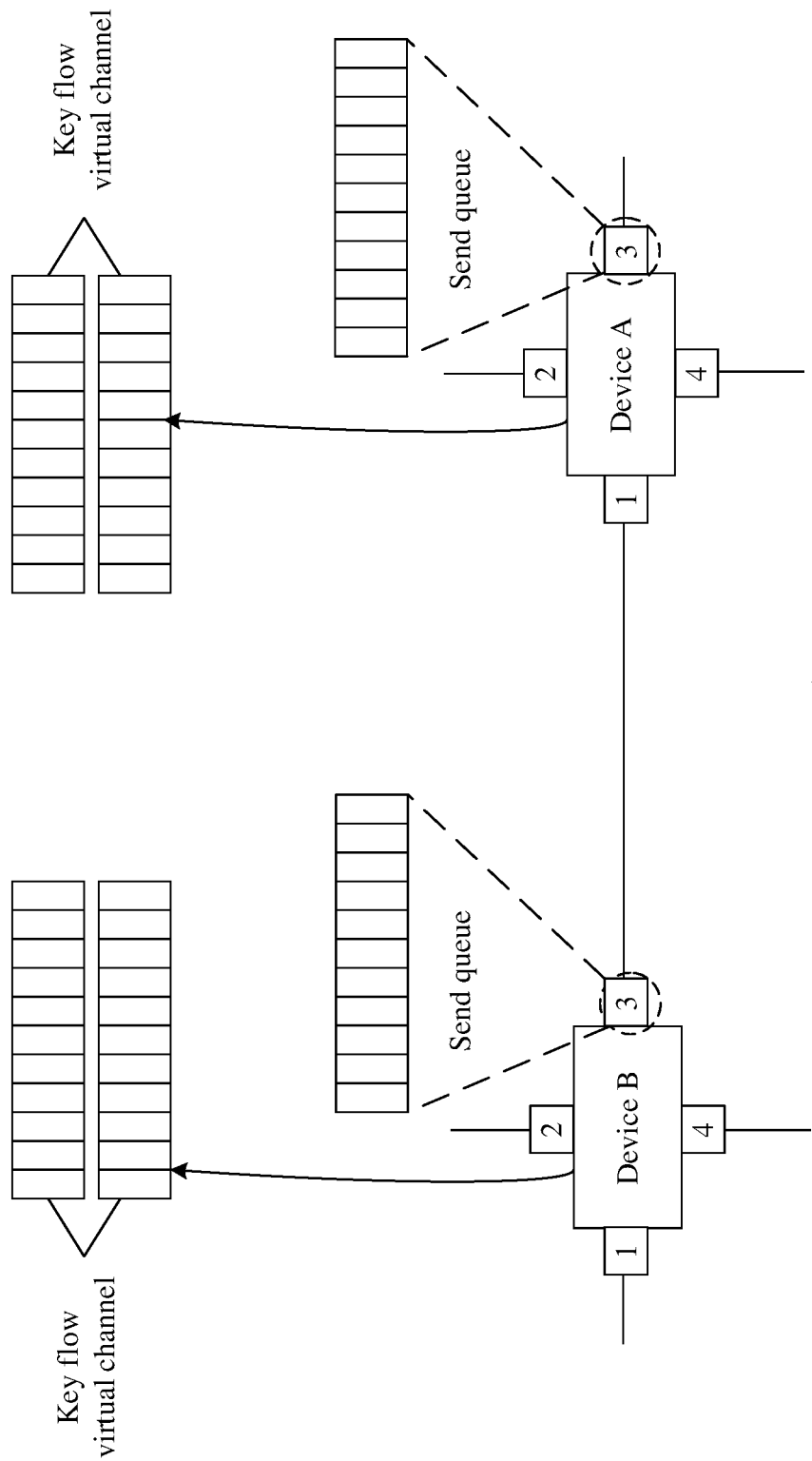
FIG. 6 is a schematic diagram of a key flow virtual channel and a send queue according to an embodiment of the present disclosure.
Figure 7:
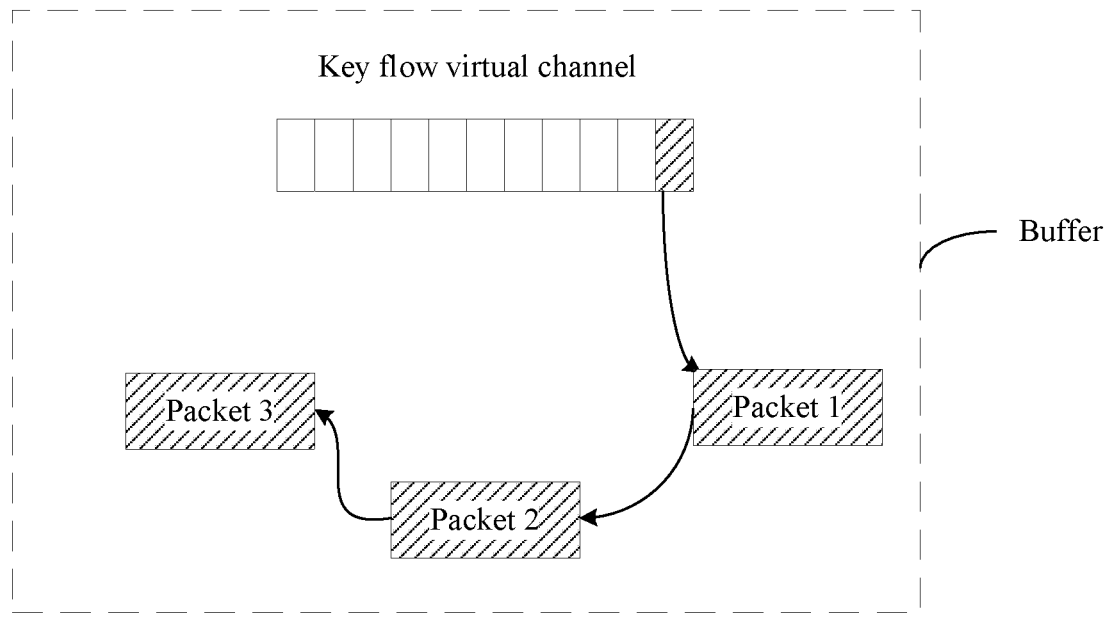
FIG. 7 is a schematic diagram of a key flow virtual channel according to an embodiment of the present disclosure.
Figure 8:
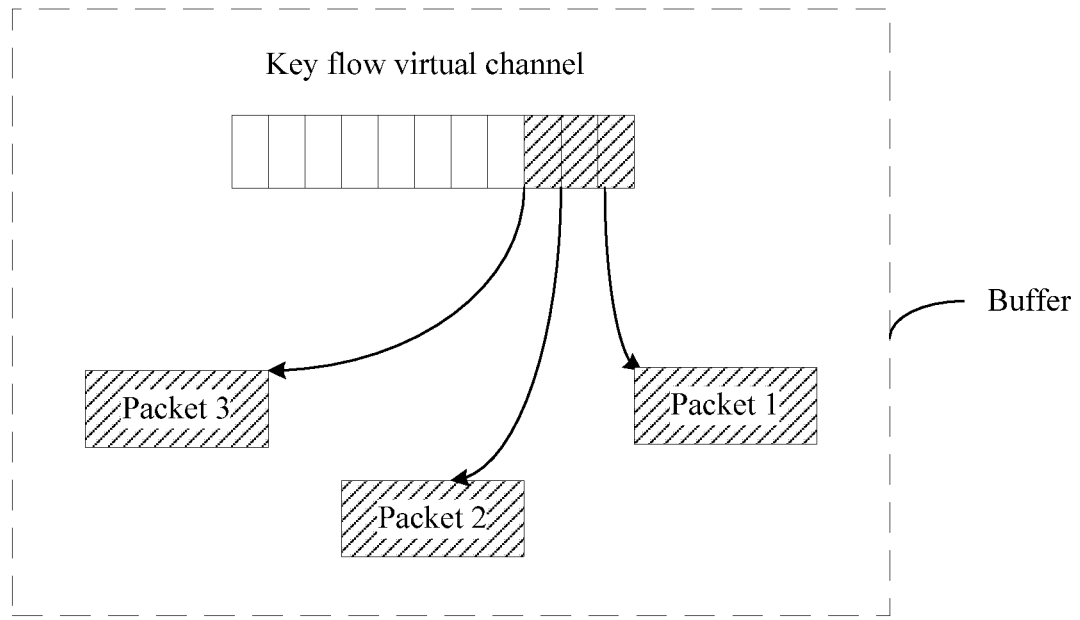
FIG. 8 is another schematic diagram of a key flow virtual channel according to an embodiment of the present disclosure.

In this embodiment, the switching device creates the key flow virtual channel for the key flow, and the key flow virtual channel is a virtual channel that stores an address of a packet of the key flow. The key flow virtual channel stores an address of a packet, and the packet is still stored in a buffer of the switching device, as shown in FIG. 6. The key flow virtual channel may be implemented in the following manners. A first manner is shown in FIG. 7. Only an address of a packet that first enters the key flow virtual channel and a statistics collection result of a quantity of bytes of the packet in the key flow virtual channel are stored in the key flow virtual channel, and packet addresses of subsequent packets are connected by using a packet pointer. A second manner is shown in FIG. 8. Each location of the key flow virtual channel stores an address of a packet, and statistics about a quantity of bytes of the packet in the key flow virtual channel is collected.

After determining the key flow, the first switching device schedules the subsequent packet. If the packet belongs to the key flow, data plane processing (for example, a table lookup operation or an encapsulation operation) is performed on the packet, and then a packet address of the packet is added to the key flow virtual channel; or a packet address of the packet is directly added to the key flow virtual channel. If the packet does not belong to the key flow, the packet is added to a port send queue after data plane processing is performed on the packet.

Step 504: When a data amount of packets in a buffer corresponding to the key flow virtual channel exceeds a first preset value, it indicates that the buffer corresponding to the key flow virtual channel is difficult to accommodate more packets, it is determined that a preset back pressure condition is met, and the first switching device generates a back pressure message including a flow attribute value of the key flow. The flow attribute value is attribute values of a plurality of flow attributes of the key flow. The back pressure message may be a back pressure frame. In addition to storing the packet address of the packet of the key flow, the key flow virtual channel further needs to reserve headroom for receiving an in-flight packet from an upstream device of the key flow. The in-flight packet is a subsequent packet within a time from a moment of sending the back pressure frame for the key flow to a moment at which the upstream device receives the back pressure frame and the back pressure frame works.

Step 505: The first switching device sends the back pressure message to a second switching device. Step 505 is similar to step 404.

Step 506: The second switching device determines the key flow in the plurality of data flows based on the flow attribute value included in the back pressure message, and pauses sending of the key flow to the first switching device.

In an optional embodiment, after determining the key flow, the second switching device creates a key flow virtual channel for the key flow, adds a subsequent packet that belongs to the key flow or a buffer address of the subsequent packet to the key flow virtual channel of the second switching device, and adds a subsequent packet of another data flow to a send queue corresponding to the another data flow. The another data flow is different from the key flow.

Step 507: When detecting that the data amount of the packets in the buffer corresponding to the key flow virtual channel does not exceed a second preset value, the first switching device generates a cancel back pressure message.

When a data amount of packets in the send queue corresponding to the key flow does not exceed a first preset threshold, it indicates that the first switching device is in a non-congested state, and the first switching device extracts, based on a packet address in the key flow virtual channel, a packet from the buffer corresponding to the key flow, and adds the extracted packet to the send queue. A second preset threshold is not less than the first preset threshold. When it is detected that the data amount of the packets in the buffer corresponding to the key flow virtual channel does not exceed the second preset value, it indicates that the buffer corresponding to the key flow virtual channel can accommodate more packets, it is determined that a preset cancel back pressure condition is met, and the first switching device generates the cancel back pressure message.

Step 508: The first switching device sends the cancel back pressure message to the second switching device.

Step 509: The second switching device sends the key flow to the first switching device.

When receiving the cancel back pressure message sent by the first switching device, the second switching device determines that the preset cancel back pressure condition is met, extracts a packet from the buffer based on a packet address in the key flow virtual channel, and adds the extracted packet to a send queue. Alternatively, when receiving the back pressure message, the second switching device starts a timer; and when timing duration of the timer is not less than preset duration, the second switching device extracts, based on a packet address in the key flow virtual channel, a packet of the key flow from the buffer corresponding to the key flow, and adds the extracted packet of the key flow to a send queue.

Figure 9:
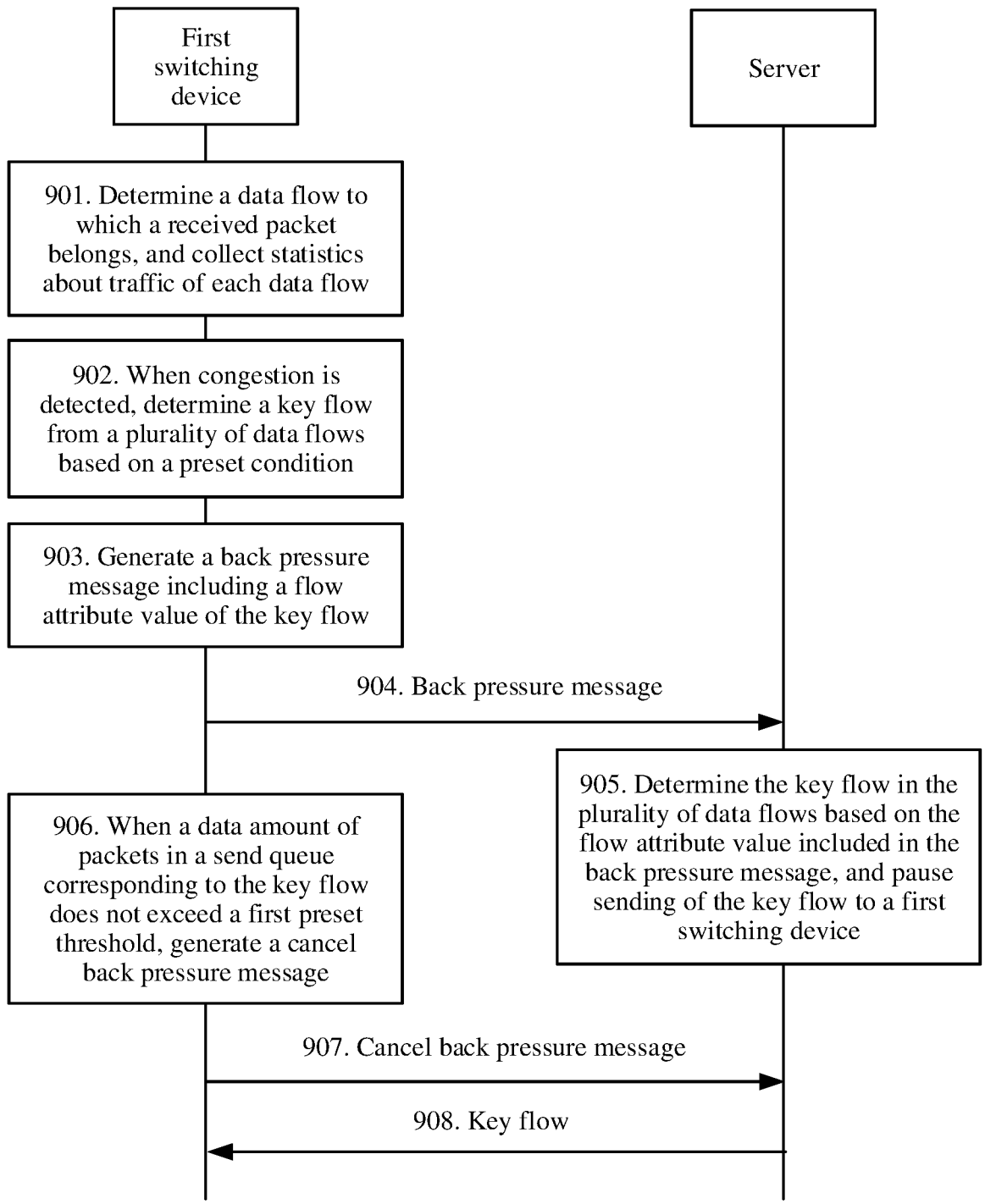
FIG. 9 is another schematic flowchart of a flow control method according to an embodiment of the present disclosure.

The foregoing describes the flow control method between switching devices, and the following describes a flow control method between a switching device and a server. Referring to FIG. 9, another embodiment of a flow control method provided in the present disclosure includes the following steps.

Step 901: A first switching device determines a data flow to which a received packet belongs, and collects statistics about traffic of each data flow.

Step 902: When congestion is detected, the first switching device determines a key flow from a plurality of data flows based on a preset condition.

Step 903: The first switching device generates a back pressure message including a flow attribute value of the key flow. The flow attribute value is attribute values of a plurality of flow attributes of the key flow. The back pressure message may be a back pressure frame. Step 901 to step 903 are similar to step 401 to step 403.

Step 904: The first switching device sends the back pressure message to a server. The back pressure message is used to instruct the server to pause sending of the key flow, and the back pressure message has no impact on sending of another data flow other than the key flow by the server.

An upstream device of the key flow is the server connected to the first switching device. In an optional embodiment, the first switching device converts the back pressure frame in the embodiment in FIG. 4 into a pause frame of standard PFC, and sends the pause frame to the server. In this manner, a network adapter of the server can trigger a back pressure procedure without supporting the back pressure frame in the present disclosure.

Step 905: The server determines the key flow in the plurality of data flows based on the flow attribute value, and pauses sending of the key flow to the first switching device.

In this embodiment, after receiving the back pressure message, the server may schedule a packet of the key flow at an application layer. A scheduling method may be pausing sending of the packet of the key flow, or may be reducing a rate of sending the packet of the key flow.

Step 906: When a data amount of packets in a send queue corresponding to the key flow does not exceed a first preset threshold, the first switching device generates a cancel back pressure message. When the data amount of the packets in the send queue corresponding to the key flow does not exceed the first preset threshold, it indicates that the send queue is in a non-congested state and has a capability of continuing to send more data, the first switching device generates the cancel back pressure message, and step 937 is triggered.

Step 907: The first switching device sends the cancel back pressure message to the server.

Step 908: The server sends the key flow to the first switching device.

When receiving the cancel back pressure message from the first switching device, the server determines that a preset cancel back pressure condition is met, and sends the key flow to the first switching device. Alternatively, when receiving the back pressure message, the server starts a timer; and when timing duration of the timer is not less than preset duration, the server determines that a preset cancel back pressure condition is met, and sends the key flow to the first switching device.

Figure 10:
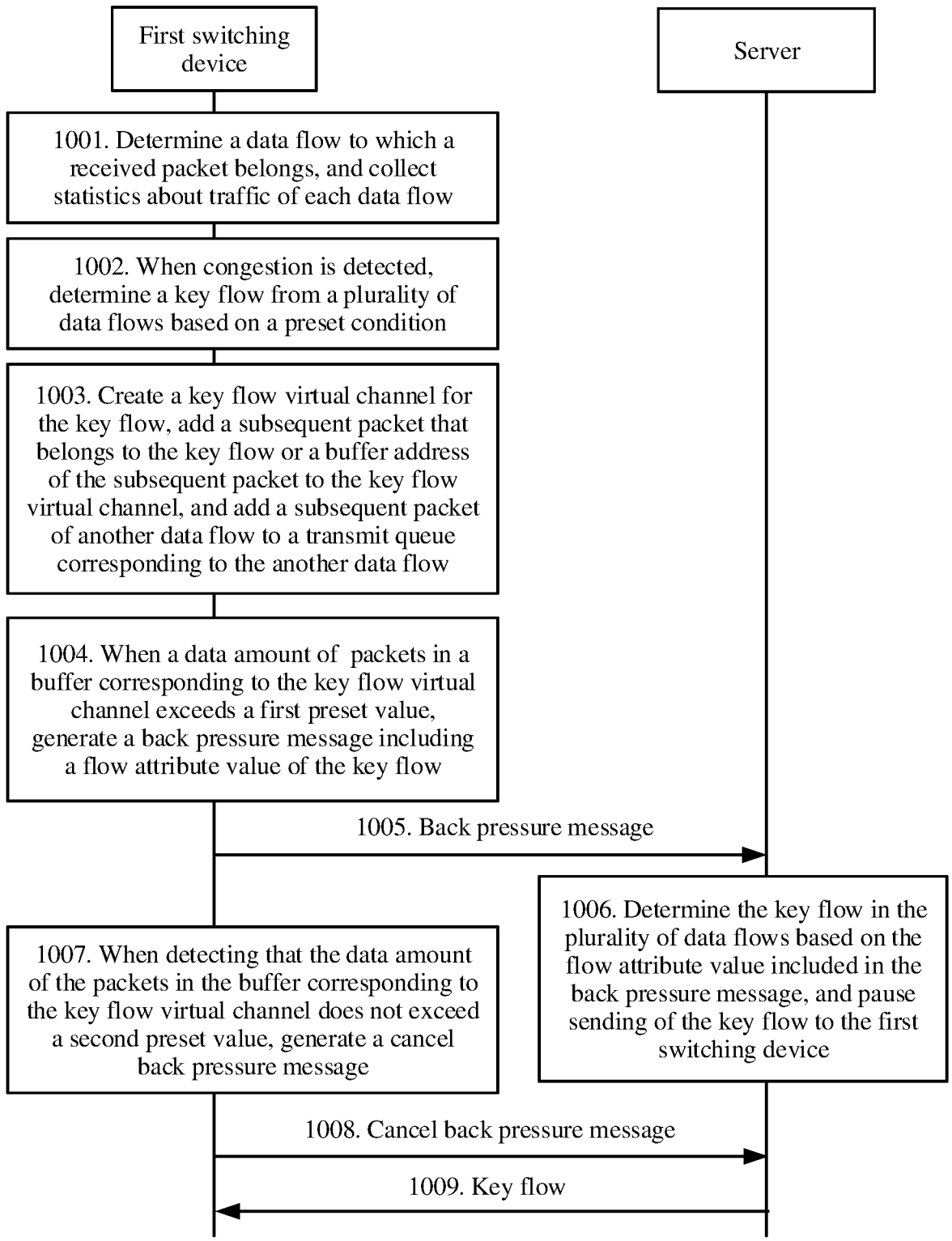
FIG. 10 is another schematic flowchart of a flow control method according to an embodiment of the present disclosure.

A switching device provided in the present disclosure may further create a key flow virtual channel for the key flow, to schedule the key flow. Referring to FIG. 10, another embodiment of a flow control method provided in the present disclosure includes the following steps.

Step 1001: A first switching device determines a data flow to which a received packet belongs, and collects statistics about traffic of each data flow.

Step 1002: When congestion is detected, the first switching device determines a key flow from a plurality of data flows based on a preset condition.

Step 1003: After determining the key flow from the plurality of data flows based on the preset condition, the first switching device creates a key flow virtual channel for the key flow, adds a subsequent packet that belongs to the key flow or a buffer address of the subsequent packet to the key flow virtual channel, and adds a subsequent packet of another data flow to a send queue corresponding to the another data flow. The another data flow is different from the key flow. The subsequent packet is a packet that is received by the first switching device and that is not added to a send queue.

Step 1004: When a data amount of packets in a buffer corresponding to the key flow virtual channel exceeds a first preset value, the first switching device generates a back pressure message including a flow attribute value of the key flow. The flow attribute value is attribute values of a plurality of flow attributes of the key flow. The back pressure message may be a back pressure frame. Step 1001 to step 1004 are similar to step 501 to step 504.

Step 1005: The first switching device sends the back pressure message to a server. An upstream device of the key flow is the server connected to the first switching device. In an optional embodiment, the first switching device converts the back pressure frame in the embodiment shown in FIG. 4 into a pause frame of standard PFC, and sends the pause frame to the server. In this manner, a network adapter of the server can trigger a back pressure procedure without supporting the back pressure frame in the present disclosure.

Step 1006: The server determines the key flow in the plurality of data flows based on the flow attribute value included in the back pressure message, and pauses sending of the key flow to the first switching device.

After receiving the back pressure frame, the server schedules a packet of the key flow at an application layer. A scheduling method may be pausing sending of the key flow, or may be reducing a rate of sending the packet of the key flow.

Step 1007: When detecting that the data amount of the packets in the buffer corresponding to the key flow virtual channel does not exceed a second preset value, the first switching device generates a cancel back pressure message. Step 1007 is similar to step 507.

Step 1008: The first switching device sends the cancel back pressure message to the server.

Step 1009: The server sends the key flow to the first switching device.

Step 1008 and step 1009 are similar to step 907 and step 908.

It can be understood that sending the key flow in this embodiment of the present disclosure means sending a packet that belongs to the key flow.

For ease of understanding, the following describes, by using a specific application scenario, the flow control method provided in the present disclosure.

A switch A has four ports: a port 1, a port 2, a port 3, and a port 4. A send queue is configured for each port. A flow table is created, where attributes of the flow table include a source IP address, a destination IP address, and a priority, and a queue number is stored. An example in which configuration duration is 1 ms is used. Statistics about an amount of data sent within the configuration duration (for example, 1 ms) is collected, and traffic of each flow is calculated.

Figure 11:
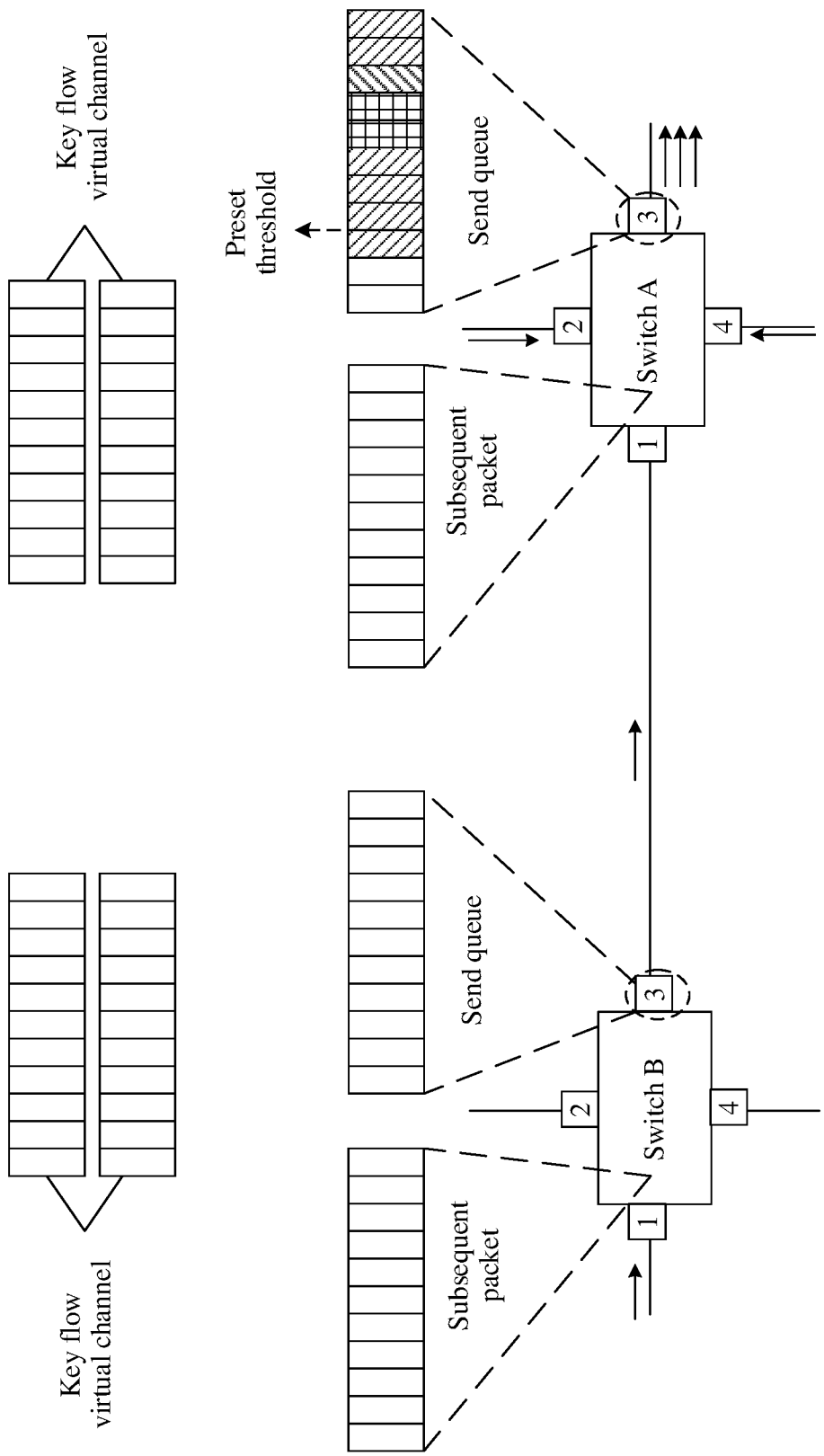
FIG. 11 is another schematic flowchart of a flow control method according to an embodiment of the present disclosure.

Referring to FIG. 11, the following describes two manners of selecting a key flow from one send queue.

Manner 1: When a quantity of bytes of packets in a send queue of the port 3 of the switch A exceeds a preset threshold, it indicates that congestion occurs in the port 3. In this case, flows of the queue include a flow 1, a flow 2, . . . , and a flow n. If traffic of an $i^{th}$ flow exceeds a preset traffic threshold, the $i^{th}$ flow is the key flow.

Manner 2: When a quantity of bytes of packets in a send queue of the port 3 of the switch A exceeds a preset threshold, and flows of the queue include a flow 1, a flow 2, ..., and a flow n in this case, if a quantity of bytes included in an $i^{th}$ flow in the queue is the largest, the $i^{th}$ flow is the key flow.

The switch A adds an address of a packet of the $i^{th}$ flow in a buffer to a key flow virtual channel instead of the send queue, and a packet of another flow continues to be added to the send queue of the port 3.

When a data amount of packets in a buffer corresponding to the key flow virtual channel exceeds a preset value, the switch A queries an upstream device, such as a switch B, of the key flow based on a routing table. The switch A sends a back pressure frame to the switch B. The back pressure frame includes a source-destination IP address pair and a priority. An example in which the source-destination IP address pair is x.x.x.3 and x.x.x.100 and the priority is 3 is used.

Figure 12:
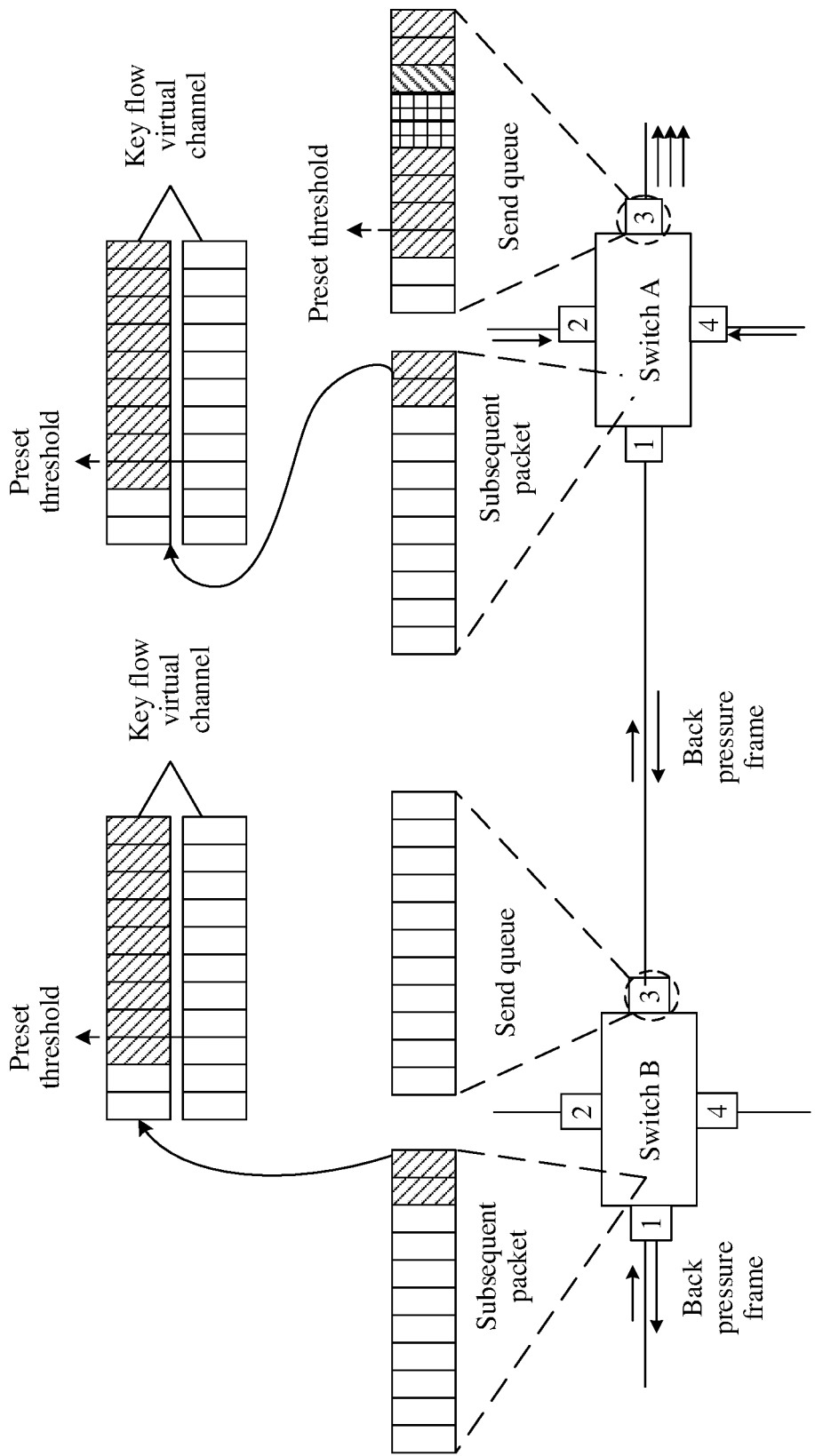
FIG. 12 is another schematic flowchart of a flow control method according to an embodiment of the present disclosure.

As shown in FIG. 12, after receiving the back pressure frame, the switch B determines, based on the source-destination IP address pair (namely, x.x.x.3 and x.x.x.100) and the priority (namely, 3) that are included in the back pressure frame, that a flow whose source IP address is x.x.x.3, destination IP address is x.x.x.100, and priority is 3 is the key flow, and adds a packet address of a subsequent packet of the key flow to a key flow virtual channel of the switch B. If a quantity of bytes of packets in a buffer corresponding to the key flow virtual channel of the switch B exceeds a preset value, the switch B continues to send the back pressure frame to an upstream device of the key flow.

Figure 13:
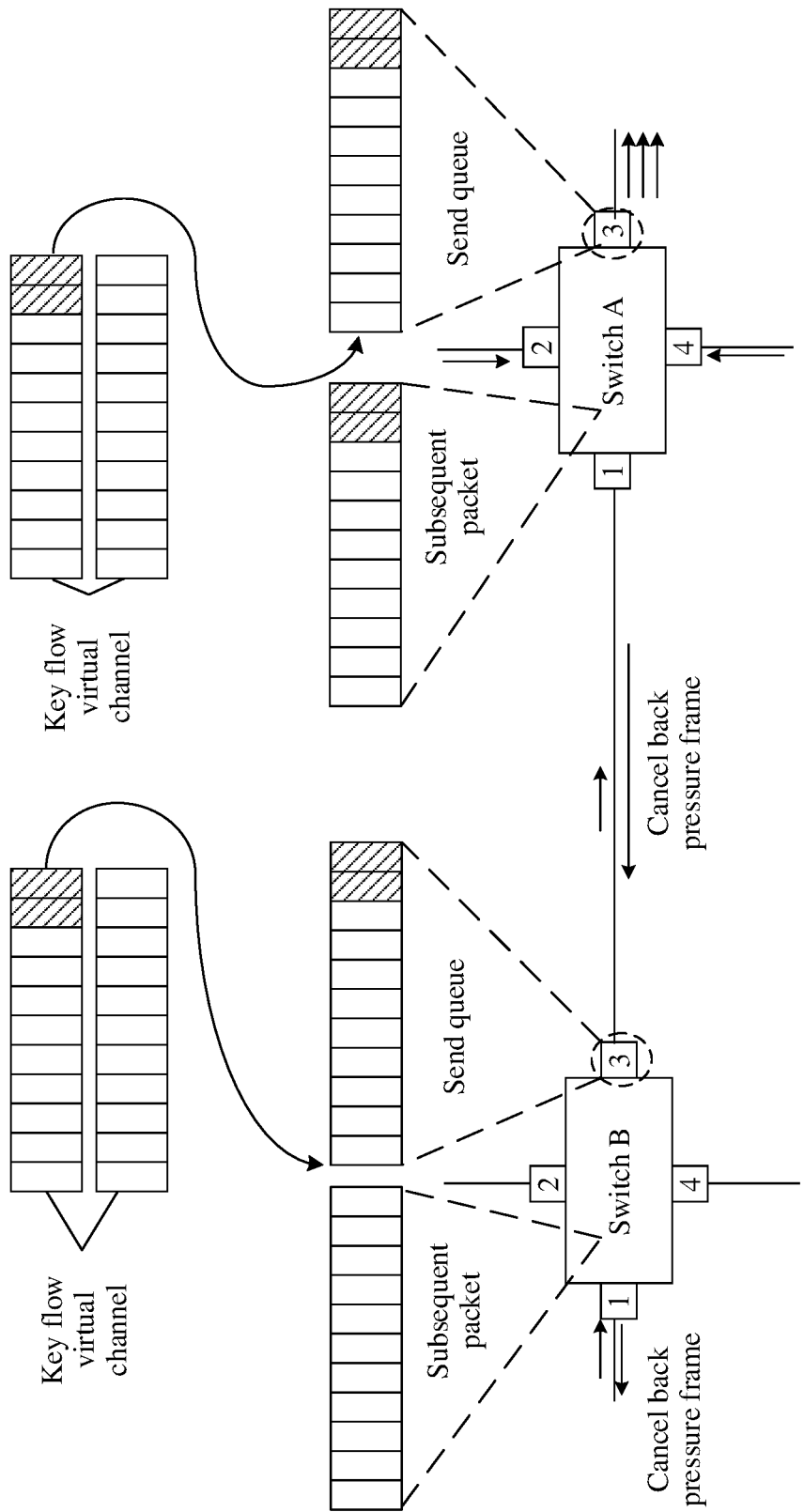
FIG. 13 is another schematic flowchart of a flow control method according to an embodiment of the present disclosure.

As shown in FIG. 13, if the quantity of bytes of the packets in the send queue of the port 3 of the switch A is less than the preset threshold, it indicates that the port 3 is back to normal. Therefore, a packet is extracted from the buffer corresponding to the key flow virtual channel, and is added to the send queue of the port 3.

When the quantity of bytes of the packets in the buffer corresponding to the key flow virtual channel is less than the preset value, the switch A may send a cancel back pressure frame to the switch B. After receiving the cancel back pressure frame, the switch B extracts a packet from the buffer corresponding to the key flow virtual channel, and adds the packet to a send queue of the switch B.

In a current system, the back pressure frame is sent to all transmit ends of packets in the send queue, for example, the switch B, a switch C, and a switch D. After the switch B, the switch C, and the switch D each receive the back pressure frame, a queue with a corresponding priority is paused. It can be learned from the foregoing example that, in the present disclosure, the back pressure frame is sent to only the switch B. After receiving the back pressure frame, the switch B pauses only sending of the key flow, and a packet that does not belong to the key flow is still normally sent. In this way, sending of a large data flow is delayed and a small data flow is normally sent in a network. Therefore, according to the present disclosure, on a basis of alleviating congestion and avoiding packet loss, congestion diffusion can be reduced, and header congestion can be resolved. In addition, because the small data flow is sensitive to a delay, the small data flow is normally sent in the present disclosure, and a delay of the small data flow is not affected.

The foregoing describes the flow control method, and the following describes a switching device that implements the flow control method.

Figure 14:
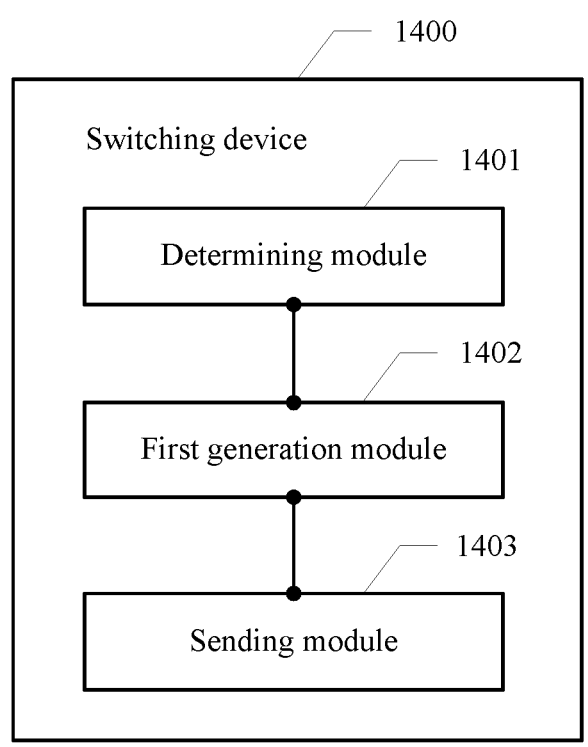
FIG. 14 is a schematic structural diagram of a switching device according to an embodiment of the present disclosure.

Referring to FIG. 14, the present disclosure provides a switching device 1400, to implement functions of the first switching device in the embodiment shown in FIG. 4, FIG. 5, FIG. 9, or FIG. 10. An embodiment of the switching device 1400 includes: a determining module 1401, configured to: when congestion is detected, determine a key flow from a plurality of data flows based on a preset condition; a first generation module 1402, configured to generate a back pressure message including a flow attribute value of the key flow; and a sending module 1403, configured to send the back pressure message to an upstream device of the key flow, where the back pressure message is used to instruct the upstream device of the key flow to pause sending of the key flow, the upstream device of the key flow is connected to the first switching device, and the back pressure message has no impact on sending of another data flow other than the key flow by the upstream device of the key flow.

Figure 15:
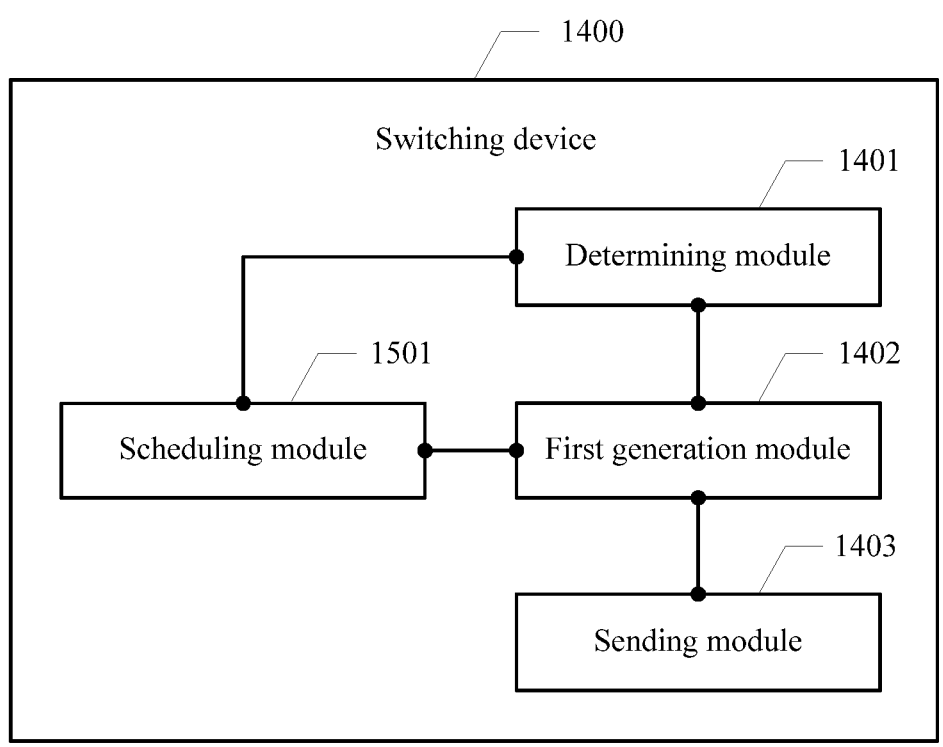
FIG. 15 is another schematic structural diagram of a switching device according to an embodiment of the present disclosure.

In another optional embodiment, as shown in FIG. 15, the switching device 1400 further includes a scheduling module 1501, configured to: before the first generation module 1402 generates the back pressure message including the flow attribute value of the key flow, create a key flow virtual channel for the key flow, add a subsequent packet that belongs to the key flow or a buffer address of the subsequent packet to the key flow virtual channel, and add a subsequent packet of another data flow to a send queue corresponding to the another data flow.

In another optional embodiment, the scheduling module 1501 is further configured to: when a data amount of packets in a send queue corresponding to the key flow does not exceed a first preset threshold, extract a packet of the key flow from a buffer corresponding to the key flow virtual channel, and add the extracted packet to the send queue.

In another optional embodiment, the first generation module 1402 is configured to: when a data amount of packets in the buffer corresponding to the key flow virtual channel exceeds a first preset value, generate the back pressure message including the flow attribute value of the key flow.

Figure 16:
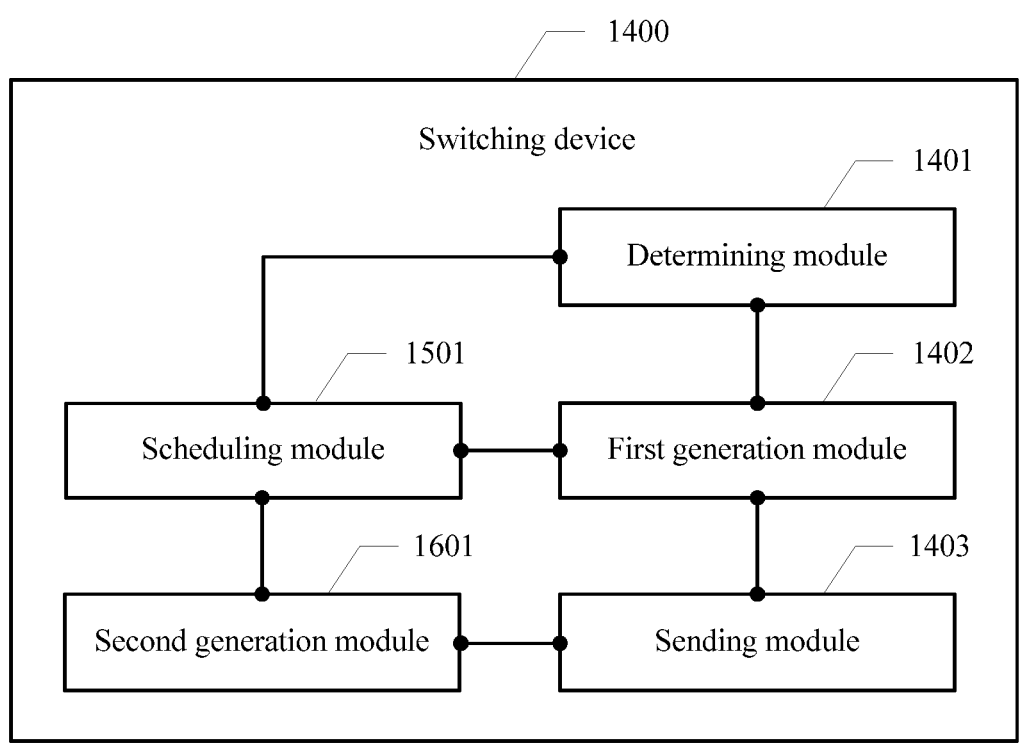
FIG. 16 is another schematic structural diagram of a switching device according to an embodiment of the present disclosure.

As shown in FIG. 16, in another optional embodiment, the switching device 1400 further includes a second generation module 1601, configured to: when the scheduling module 1501 determines that the data amount of the packets in the buffer corresponding to the key flow virtual channel does not exceed a second preset value, generate a cancel back pressure message.

The sending module 1403 is further configured to send the cancel back pressure message to a second switching device, where the second preset value is less than or equal to the first preset value.

In another optional embodiment, the determining module 1401 is configured to: when detecting that the data amount of the packets in the send queue exceeds a second preset threshold, use a data flow whose traffic is greater than the preset traffic threshold in the plurality of data flows as the key flow; or when detecting that congestion occurs in the send queue, determine a data amount of each data flow in the send queue, and use a data flow with a largest data amount as the key flow.

Figure 17:
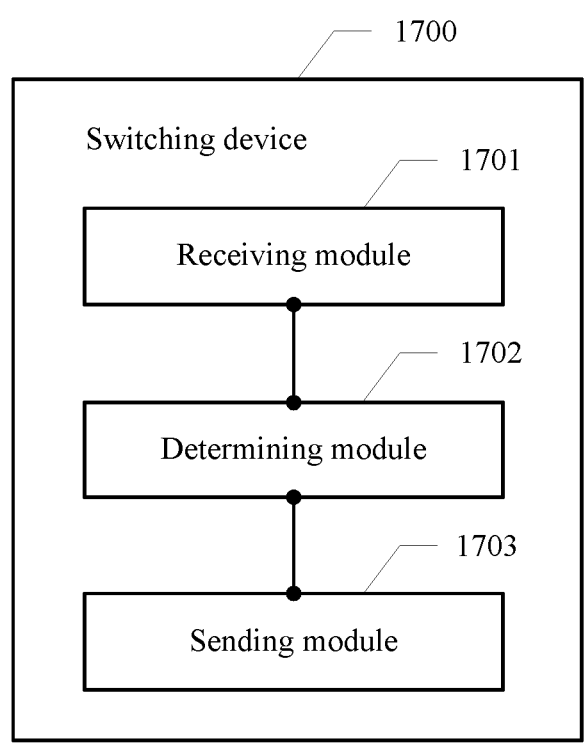
FIG. 17 is another schematic structural diagram of a switching device according to an embodiment of the present disclosure.

Referring to FIG. 17, the present disclosure provides another switching device 1700, to implement functions of the second switching device in the embodiment shown in FIG. 4 or FIG. 5. An embodiment of the switching device 1700 includes: a receiving module 1701, configured to receive a back pressure message sent by a first switching device, where the back pressure message includes a flow attribute value; a determining module 1702, configured to determine a key flow in a plurality of data flows based on the flow attribute value; and a sending module 1703, configured to pause sending of the key flow to the first switching device.

Figure 18:
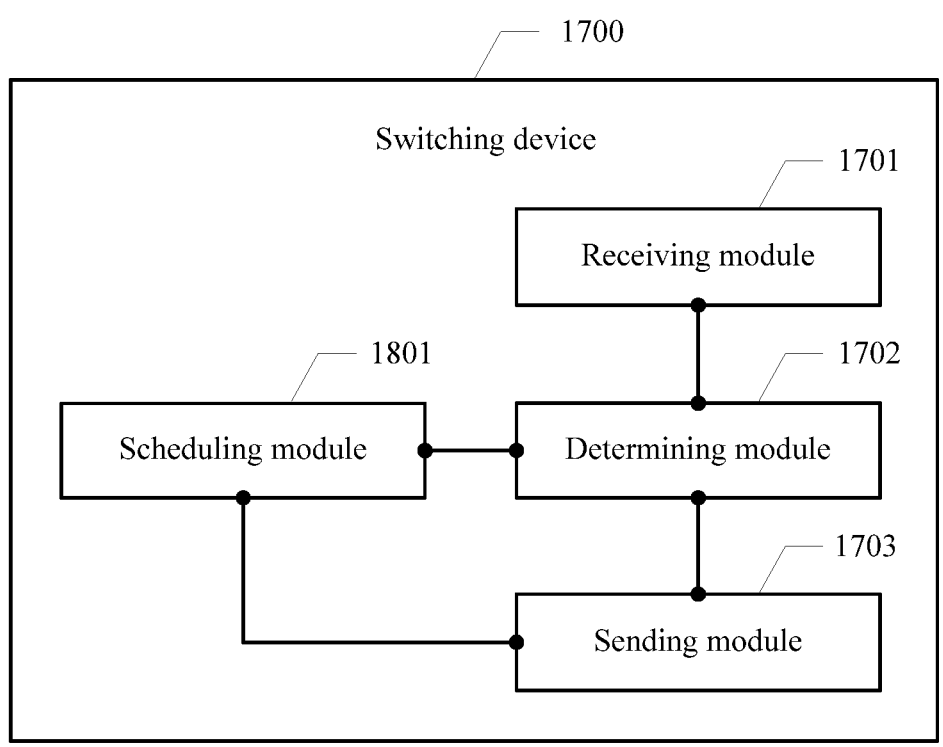
FIG. 18 is another schematic structural diagram of a switching device according to an embodiment of the present disclosure.

In another optional embodiment, referring to FIG. 18, the switching device 1700 further includes a scheduling module 1801, configured to: create a key flow virtual channel for the key flow, add a subsequent packet that belongs to the key flow or a buffer address of the subsequent packet to the key flow virtual channel, and add a subsequent packet that does not belong to the key flow to a send queue, where the subsequent packet is a packet that is received by the second switching device and that is not added to the send queue.

The scheduling module 1801 is further configured to: when detecting that information meets a preset cancel back pressure condition, extract a packet of the key flow from a buffer corresponding to the key flow virtual channel, and add the extracted packet to the send queue.

Figure 19:
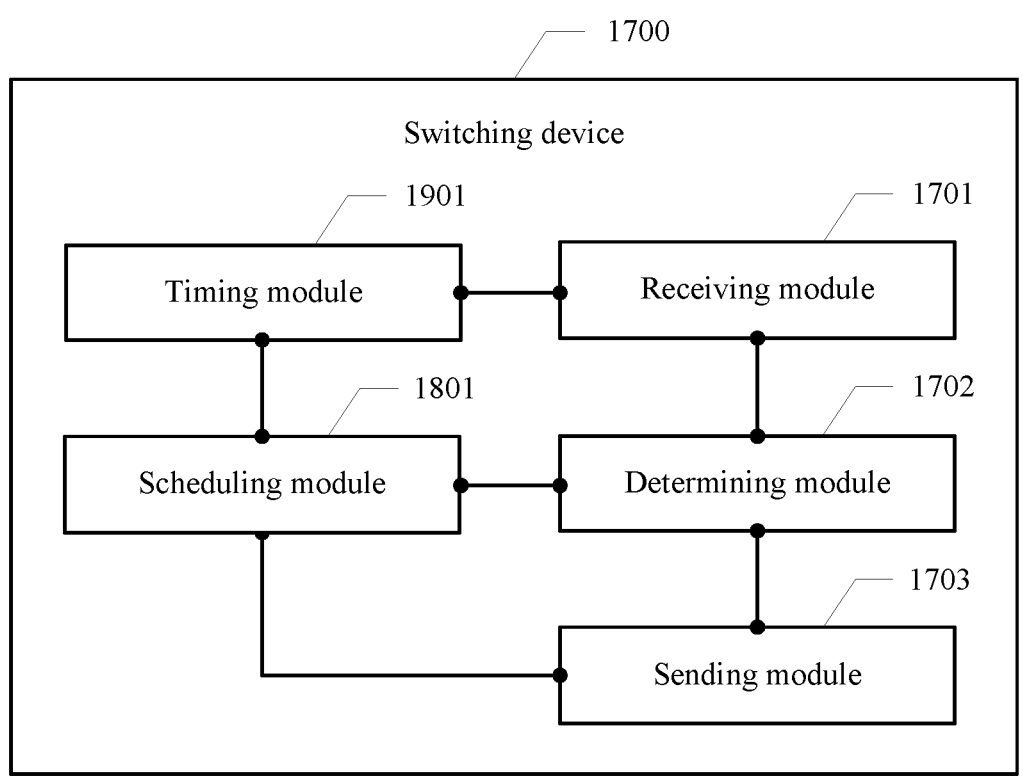
FIG. 19 is another schematic structural diagram of a switching device according to an embodiment of the present disclosure.

In another optional embodiment, as shown in FIG. 19, the switching device 1700 further includes: a timing module 1901, configured to start a timer based on the back pressure message.

The scheduling module 1801 is configured to: when timing duration of the timer is not less than preset duration, extract the packet of the key flow from the buffer corresponding to the key flow virtual channel.

In another optional embodiment, the scheduling module 1801 is configured to: when the receiving module 1701 receives a cancel back pressure message sent by the first switching device, extract the packet of the key flow from the buffer corresponding to the key flow virtual channel.

Figure 20:
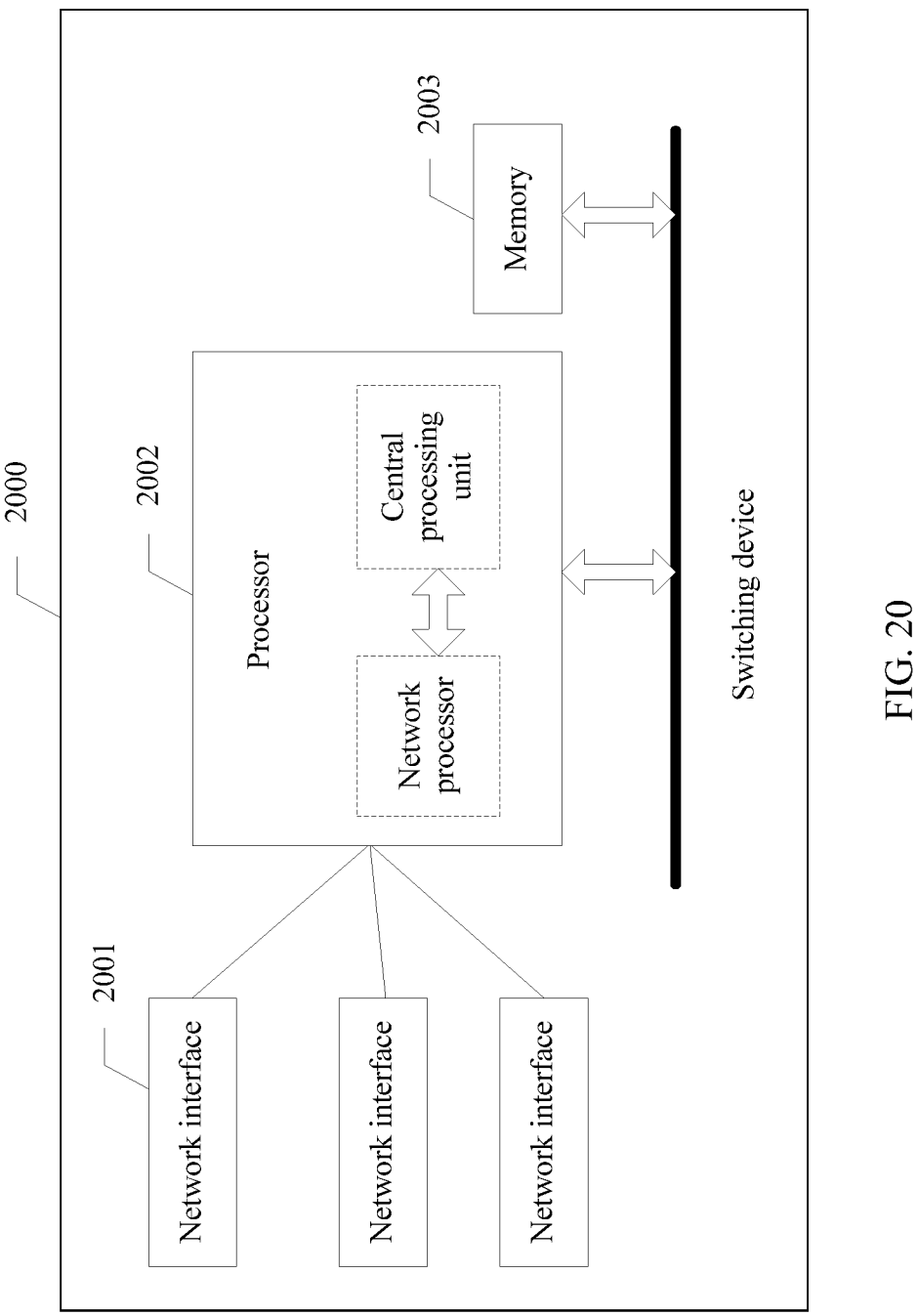
FIG. 20 is another schematic structural diagram of a switching device according to an embodiment of the present disclosure.

Referring to FIG. 20, the present disclosure provides a switching device 2000. An embodiment of the switching device 2000 provided in the present disclosure includes one or more network interfaces 2001, one or more processors 2002, and one or more memories 2003. The network interface 2001, the processor 2002, and the memory 2003 are connected to and communicate with each other by using a bus.

The processor 2002 may include a central processing unit CPU), a network processor NP), or the like; or may be a digital signal processor (DSP), an application-specific integrated circuit (ASIC), a field-programmable gate array (FPGA) or another programmable logic device, or the like.

The memory 2003 may include a random access memory (RAM) or a read-only memory (ROM), or may include a non-volatile memory (NVM), for example, at least one magnetic disk storage.

The memory 2003 is configured to store data and an operation instruction. By invoking the operation instruction stored in the memory 2003, the processor 2002 may perform the method performed by the first switching device in the embodiment or the optional embodiment shown in FIG. 4, FIG. 5, FIG. 9, or FIG. 10, or may perform the method performed by the second switching device in the embodiment or the optional embodiment shown in FIG. 4 or FIG. 5.

In several embodiments provided in the present disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method, comprising:
   when congestion is detected, determining, by a first switching device, a key flow based on a preset condition, wherein the key flow is one data flow selected from a plurality of data flows associated with a receive queue in the first switching device;
   generating, by the first switching device, a back pressure message comprising a flow attribute value of the key flow; and
   sending, by the first switching device, the back pressure message to an upstream device of the key flow, wherein the back pressure message instructs the upstream device of the key flow to pause sending of the key flow, the upstream device of the key flow is a second switching device and is connected to the first switching device, and the back pressure message has no impact on a sending of another data flow of the plurality of data flows other than the key flow by the upstream device of the key flow.

2. The method according to claim 1, wherein before generating the back pressure message comprising the flow attribute value of the key flow, the method further comprises:
   creating, by the first switching device, a key flow virtual channel for the key flow; and
   adding, to the key flow virtual channel, a subsequent packet that belongs to the key flow or a buffer address of the subsequent packet.

3. The method according to claim 2, further comprising:
   when a data amount of packets in a send queue corresponding to the key flow does not exceed a first preset threshold, extracting, by the first switching device, a packet of the key flow from a buffer corresponding to the key flow virtual channel, and adding the extracted packet to the send queue.

4. The method according to claim 2, wherein generating the back pressure message comprising the flow attribute value of the key flow comprises:
   when a data amount of packets in a buffer corresponding to the key flow virtual channel exceeds a first preset value, generating, by the first switching device, the back pressure message comprising the flow attribute value of the key flow.

5. The method according to claim 4, further comprising:
   when the data amount of the packets in the buffer corresponding to the key flow virtual channel does not exceed a second preset value, generating, by the first switching device, a cancel back pressure message, and sending the cancel back pressure message to the second switching device, wherein the second preset value is less than or equal to the first preset value.

6. The method according to claim 1, wherein the preset condition is a preset traffic threshold, and determining the key flow from the plurality of data flows based on the preset condition comprises:
   when it is detected that a data amount of packets in a send queue exceeds a second preset threshold, determining, by the first switching device, a data flow whose traffic is greater than the preset traffic threshold in the plurality of data flows to be the key flow; or when it is detected that congestion occurs in the send queue, determining, by the first switching device, a data amount of each data flow in the send queue, and determining a data flow with a largest data amount to be the key flow.

7. A method, comprising:

receiving, by a second switching device, a back pressure message sent by a first switching device, wherein the back pressure message comprises a flow attribute value;

determining, by the second switching device, a key flow based on the flow attribute value, wherein the key flow is one data flow selected from a plurality of data flows associated with a send queue in the second switching device; and pausing, by the second switching device, sending of the key flow to the first switching device without affecting a transmission of any other data flow of the plurality of data flows.

8. The method according to claim 7, wherein after determining, by the second switching device, the key flow in the plurality of data flows based on the flow attribute value, the method further comprises:

creating, by the second switching device, a key flow virtual channel for the key flow;

adding, to the key flow virtual channel, a subsequent packet that belongs to the key flow or a buffer address of the subsequent packet; and when a preset cancel back pressure condition is met, extracting, by the second switching device, a packet of the key flow from a buffer corresponding to the key flow virtual channel, and adding the extracted packet to a send queue.

9. The method according to claim 8, wherein after receiving, by the second switching device, the back pressure message sent by a first switching device, the method further comprises:

starting, by the second switching device, a timer based on the back pressure message; and wherein when the preset cancel back pressure condition is met, extracting, by the second switching device, the packet of the key flow from the buffer corresponding to the key flow virtual channel comprises:

when a timing duration of the timer is not less than a preset duration, extracting, by the second switching device, the packet of the key flow from the buffer corresponding to the key flow virtual channel.

10. The method according to claim 8, wherein when the preset cancel back pressure condition is met, extracting, by the second switching device, the packet of the key flow from the buffer corresponding to the key flow virtual channel comprises:

when receiving a cancel back pressure message sent by the first switching device, extracting, by the second switching device, the packet of the key flow from the buffer corresponding to the key flow virtual channel.

11. A switching device, comprising:
a transmitter;
a processor; and
a non-transitory computer-readable storage medium storing a program to be executed by the processor, the program including instructions for:
when congestion is detected, determine a key flow based on a preset condition, wherein the key flow is one data flow selected from a plurality of data flows associated with a receive queue in the switching device;
generate a back pressure message comprising a flow attribute value of the key flow; and
send, using the transmitter, the back pressure message to an upstream device of the key flow, wherein the back pressure message instructs the upstream device of the key flow to pause sending of the key flow, the upstream device of the key flow is a second switching device and is connected to the switching device, and the back pressure message has no impact on a sending of another data flow of the plurality of data flows other than the key flow by the upstream device of the key flow.

12. The switching device according to claim 11, wherein the program further includes instructions for:

before sending the back pressure message comprising the flow attribute value of the key flow:
create a key flow virtual channel for the key flow; and
add, to the key flow virtual channel, a subsequent packet that belongs to the key flow or a buffer address of the subsequent packet.

13. The switching device according to claim 12, wherein the program further includes instructions for:

when a data amount of packets in a send queue corresponding to the key flow does not exceed a first preset threshold, extract a packet of the key flow from a buffer corresponding to the key flow virtual channel, and add the extracted packet to the send queue.

14. The switching device according to claim 13, wherein the program further includes instructions for:

when a data amount of packets in the buffer corresponding to the key flow virtual channel exceeds a first preset value, generate the back pressure message comprising the flow attribute value of the key flow.

15. The switching device according to claim 14, wherein the program further includes instructions for:

when the data amount of the packets in the buffer corresponding to the key flow virtual channel does not exceed a second preset value, generate a cancel back pressure message; and send, using the transmitter, the cancel back pressure message to the second switching device, wherein the second preset value is less than or equal to the first preset value.

16. The switching device according to claim 11, wherein the program further includes instructions for:

when it is detected that a data amount of packets in a send queue exceeds a second preset threshold, determine a data flow whose traffic is greater than a preset traffic threshold in the plurality of data flows to be the key flow; or when it is detected that congestion occurs in the send queue, determine a data amount of each data flow in the send queue, and determine a data flow with a largest data amount to be the key flow.

17. A switching device, comprising:
a receiver;
a processor; and
a non-transitory computer-readable storage medium storing a program to be executed by the processor, the program including instructions for:
receiving, through the receiver, a back pressure message sent by a second switching device, wherein the back pressure message comprises a flow attribute value;

determining a key flow based on the flow attribute value, wherein the key flow is one data flow selected from a plurality of data flows associated with a send queue in the switching device; and pause sending of the key flow to a the second switching device without affecting a transmission of any other data flow of the plurality of data flows.

18. The switching device according to claim 17, wherein the program further includes instructions for:

creating a key flow virtual channel for the key flow;

adding, to the key flow virtual channel, a subsequent packet that belongs to the key flow or a buffer address of the subsequent packet; and when it is detected that information meets a preset cancel back pressure condition, extracting a packet of the key flow from a buffer corresponding to the key flow virtual channel, and adding the extracted packet to a send queue.

19. The switching device according to claim 18, wherein the program further includes instructions for:

starting a timer based on the back pressure message; and when a timing duration of the timer is not less than a preset duration, extracting the packet of the key flow from the buffer corresponding to the key flow virtual channel.

20. The switching device according to claim 18, wherein the program further includes instructions for:

when a cancel back pressure message is received from the second switching device, extracting the packet of the key flow from the buffer corresponding to the key flow virtual channel.

\* \* \* \* \*